United States Patent
Sun et al.

(10) Patent No.: US 12,477,612 B2
(45) Date of Patent: Nov. 18, 2025

(54) CONFIGURATION METHOD AND APPARATUS

(71) Applicant: HUAWEI TECHNOLOGIES CO., LTD., Shenzhen (CN)

(72) Inventors: Huiming Sun, Shanghai (CN); Tingting Geng, Shanghai (CN); Hongping Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 434 days.

(21) Appl. No.: 18/147,028

(22) Filed: Dec. 28, 2022

(65) Prior Publication Data

US 2023/0133425 A1 May 4, 2023

Related U.S. Application Data

(63) Continuation of application No. PCT/CN2021/096446, filed on May 27, 2021.

(30) Foreign Application Priority Data

Jul. 2, 2020 (CN) .......................... 202010639037.4

(51) Int. Cl.
*H04W 76/22* (2018.01)
(52) U.S. Cl.
CPC .................. *H04W 76/22* (2018.02)
(58) Field of Classification Search
CPC ..... H04W 76/22; H04W 76/15; H04W 76/34; H04W 24/02; H04W 74/085; Y02D 30/70
See application file for complete search history.

(56) References Cited

U.S. PATENT DOCUMENTS

| | | | |
|---|---|---|---|
| 2015/0029955 A1 | 1/2015 | Heo et al. | |
| 2016/0037579 A1 | 2/2016 | Jung et al. | |
| 2016/0338139 A1 | 11/2016 | Kwon | |
| 2019/0363861 A1 | 11/2019 | Qiu et al. | |
| 2020/0205041 A1 | 6/2020 | Ang et al. | |

(Continued)

FOREIGN PATENT DOCUMENTS

| | | |
|---|---|---|
| CN | 105247941 A | 1/2016 |
| CN | 105451364 A | 3/2016 |

(Continued)

OTHER PUBLICATIONS

Extended European Search Report issued in corresponding European Application No. 21833056.1, dated Nov. 17, 2023, pp. 1-21.

(Continued)

*Primary Examiner* — Nizam U Ahmed
(74) *Attorney, Agent, or Firm* — HAUPTMAN HAM, LLP

(57) ABSTRACT

This application provides a configuration method and an apparatus, and relates to the field of communications technologies, so that in a scenario in which an SCG is deactivated, a network side can activate the SCG or a cell in the SCG by using a MAC CE. The method includes: A terminal receives a MAC CE from a first node, where the MAC CE is for activating or deactivating one or more cells in a cell group managed by a second node; and then the terminal activates or deactivates, based on the MAC CE, the one or more cells in the cell group managed by the second node.

20 Claims, 8 Drawing Sheets

(56) References Cited

U.S. PATENT DOCUMENTS

| | | | |
|---|---|---|---|
| 2022/0264466 A1* | 8/2022 | Ai | .................. H04L 5/0098 |
| 2024/0098795 A1* | 3/2024 | Yavuz | ............... H04W 74/0833 |

FOREIGN PATENT DOCUMENTS

| | | |
|---|---|---|
| CN | 107079502 A | 8/2017 |
| CN | 109219142 A | 1/2019 |

OTHER PUBLICATIONS

3GPP TS 38.331 V16.0.0 (Mar. 2020), 3rd Generation Partnership Project; Technical Specification Group Radio Access Network; NR; Radio Resource Control (RRC) protocol specification (Release 16), 835 pages.

3GPP TS 36.331 V16.0.0:"3rd Generation Partnership Project;Technical Specification Group Radio Access Network; Evolved Universal Terrestrial Radio Access (E-UTRA); Radio Resource Control (RRC);Protocol specification(Release 16)",Mar. 2020, total 1048 pages.

3GPP TS 36.423 V16.1.0:"3rd Generation Partnership Project;Technical Specification Group Radio Access Network; Evolved Universal Terrestrial Radio Access Network(E-UTRAN);X2 application protocol (X2AP)(Release 16)",Mar. 2020, total 438 pages.

3GPP TS 38.423 V16.1.0 (Mar. 2020), 3rd Generation Partnership Project; Technical Specification Group Radio Access Network; NG-RAN; Xn application protocol (XnAP)(Release 16), 334 pages.

3GPP TS 38.473 V15.9.0:"3rd Generation Partnership Project;Technical Specification Group Radio Access Network; NG-RAN;F1 application protocol (F1AP)(Release 15)",Mar. 2020,total 222 pages.

International Search Report issued in corresponding International Application No. PCT/CN2021/096446, dated Jul. 29, 2021, pp. 1-10.

* cited by examiner

| $C_7$ | $C_6$ | $C_5$ | $C_4$ | $C_3$ | $C_2$ | $C_1$ | R | Byte 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Byte 2 |
| $C_{23}$ | $C_{22}$ | $C_{21}$ | $C_{20}$ | $C_{19}$ | $C_{18}$ | $C_{17}$ | $C_{16}$ | Byte 3 |
| $C_{31}$ | $C_{30}$ | $C_{29}$ | $C_{28}$ | $C_{27}$ | $C_{26}$ | $C_{25}$ | $C_{24}$ | Byte 4 |

CONFIGURATION METHOD AND APPARATUS

CROSS-REFERENCE TO RELATED APPLICATIONS

This application is a continuation of International Application No. PCT/CN2021/096446, filed on May 27, 2021, which claims priority to Chinese Patent Application No. 202010639037.4, filed on Jul. 2, 2020. The disclosures of the aforementioned applications are hereby incorporated by reference in their entireties.

TECHNICAL FIELD

This application relates to the field of communications technologies, and in particular, to a configuration method and an apparatus.

BACKGROUND

In a dual connectivity (dual connectivity, DC), for example, multi-radio dual connectivity (multi-radio dual connectivity, MR-DC) scenario, a terminal may communicate with a plurality of access network devices. For example, the terminal may simultaneously communicate with a master cell group (master cell group, MCG) managed by a master node (master node, MN) and a secondary cell group (secondary cell group, SCG) managed by a secondary node (secondary node, SN). Further, when the terminal transmits a small amount of data or no data on an SCG side, or a required data rate is low, the terminal temporarily deactivates or suspends the SCG, to reduce power consumption of the terminal. However, when data transmitted by the terminal on the SCG side is active, or the required data rate is high, the terminal activates the SCG, to maintain smoothness of data transmission.

Currently, a network side may activate or deactivate a cell in a cell group by using a MAC CE. However, a design of the MAC CE is not flexible enough. As a result, the MAC CE cannot satisfy some management requirements of the network side on the cell in the cell group. For example, when a primary secondary cell (primary secondary cell, PSCell) in the secondary cell group is in an activated state, the terminal may receive a MAC CE delivered by the secondary node, and activate/deactivate a cell in the SCG based on the MAC CE delivered by the secondary node. However, when the SCG of the terminal is in a deactivated state, because the terminal stops monitoring a physical downlink control channel (physical downlink control channel, PDCCH) sent by the secondary node, the terminal cannot receive the MAC CE that carries an SCG activation indication and that is sent by the secondary node. Consequently, the terminal cannot activate the SCG.

SUMMARY

This application provides a configuration method and an apparatus, to satisfy, in some communication scenarios (for example, when an SCG is deactivated), a requirement of a network side on managing a cell in a cell group by using a MAC CE.

According to a first aspect, a configuration method is provided, including: A terminal receives a media access control layer (medium access control, MAC) control element (control element, CE) sent by a first node, where the MAC CE is for activating or deactivating one or more cells in a cell group managed by a second node, and the first node is different from the second node; and the terminal activates or deactivates, based on the MAC CE, the one or more cells in the cell group managed by the second node.

Based on the foregoing technical solution, the first node sends the MAC CE to the terminal, so that the terminal can activate/deactivate, based on the MAC CE sent by the first node, the cell in the cell group managed by the second node. In comparison with a conventional technology in which a MAC CE sent by a node is for activating/deactivating only a cell in a cell group managed by the node, the MAC CE provided in this embodiment of this application can enable a node to indicate a terminal to activate/deactivate a cell in a cell group managed by another node, so that flexibility of the MAC CE is improved, and a requirement of a network side on using the MAC CE in some special scenarios is satisfied. For example, in a scenario in which an SCG is deactivated, the technical solution provided in this application ensures that a master node can indicate, by using the MAC CE, a terminal to activate a cell in the SCG, so that the network side can effectively manage the SCG.

In a possible design, the first node is a master node, the second node is a secondary node, and the cell group managed by the second node is an SCG.

In a possible design, the first node is a secondary node, the second node is a master node, and the cell group managed by the second node is an MCG.

In a possible design, when all cells in the SCG are in a deactivated state, the MAC CE is for activating at least a primary secondary cell.

In a possible design, the MAC CE is further for activating at least one secondary cell. The secondary cell may be a secondary cell in the MCG, or may be a secondary cell in the SCG.

In a possible design, the MAC CE includes first indication information. The first indication information is a reserved bit whose value is a first value in a payload of the MAC CE.

In a possible design, when a master cell group MCG includes a primary cell and M secondary cells, and the SCG includes the primary secondary cell and N−1 secondary cells, the payload of the MAC CE includes M first bits and N second bits. M is a nonnegative integer, and N is a positive integer. The M first bits are in a one-to-one correspondence with the M secondary cells in the MCG. When a value of the first bit is a second value, the first bit indicates to activate the secondary cell corresponding to the first bit. Alternatively, when a value of the first bit is a third value, the first bit indicates to deactivate the secondary cell corresponding to the first bit. The N second bits are in a one-to-one correspondence with the N cells in the SCG. When a value of the second bit is a second value, the second bit indicates to activate the cell corresponding to the second bit. Alternatively, when a value of the second bit is a third value, the second bit indicates to deactivate the cell corresponding to the second bit.

In a possible design, a subheader (subheader) of the MAC CE includes a logical channel identifier (logical channel identifier, LCD) whose value is 57 or 58. Based on this design, a MAC CE for activating/deactivating an SCell in a conventional technology is reused as the MAC CE provided in this application.

In a possible design, a payload of the MAC CE includes one or more third bits, and each third bit corresponds to one SCG. When a value of the third bit is a fourth value, the third bit indicates to activate the SCG corresponding to the third bit. Alternatively, when a value of the third bit is a fifth value, the third bit indicates to deactivate the SCG corresponding to the third bit.

In a possible design, when a subheader of the MAC CE includes an LCID whose value is a second preset value, the MAC CE indicates to deactivate the SCG. Alternatively, when a subheader of the MAC CE includes an LCID whose value is a third preset value, the MAC CE indicates to activate the SCG. Optionally, based on this design, the MAC CE does not include a payload. Based on this design, signaling overheads can be reduced.

In a possible design, the configuration method further includes: The terminal sends second indication information to the first node or the second node. The second indication information indicates that the terminal has a capability of activating or deactivating, based on the MAC CE sent by the first node, the cell in the cell group managed by the second node. Alternatively, the second indication information indicates that the terminal does not have the capability of activating or deactivating, based on the MAC CE sent by the first node, the cell in the cell group managed by the second node. Based on this design, the network side may learn, based on the second indication information, whether the terminal has the capability of activating or deactivating, based on the MAC CE sent by the first node, the cell in the cell group managed by the second node.

In a possible design, the configuration method further includes: The terminal receives first request information sent by the first node. The first request information is for requesting the terminal to report the second indication information.

According to a second aspect, a configuration method is provided, including: A first node generates a MAC CE, where the MAC CE is for activating or deactivating one or more cells in a cell group managed by a second node, and the first node is different from the second node; and the first node sends the MAC CE to a terminal.

Based on the foregoing technical solution, the first node sends the MAC CE to the terminal, so that the terminal can activate/deactivate, based on the MAC CE sent by the first node, the cell in the cell group managed by the second node. In comparison with a conventional technology in which a MAC CE sent by a node is for activating/deactivating only a cell in a cell group managed by the node, the MAC CE provided in this embodiment of this application can enable a node to indicate a terminal to activate/deactivate a cell in a cell group managed by another node, so that flexibility of the MAC CE is improved, and a requirement of a network side on using the MAC CE in some special scenarios is satisfied. For example, in a scenario in which an SCG is deactivated, the technical solution provided in this application ensures that a master node can indicate, by using the MAC CE, a terminal to activate a cell in the SCG, so that the network side can effectively manage the SCG.

In a possible design, the first node is a master node, the second node is a secondary node, and the cell group managed by the second node is an SCG.

In a possible design, the first node is a secondary node, the second node is a master node, and the cell group managed by the second node is an MCG.

In a possible design, when all cells in the SCG are in a deactivated state, the MAC CE is for activating at least a primary secondary cell.

In a possible design, the MAC CE is further for activating at least one secondary cell.

In a possible design, when a primary secondary cell in the SCG is in an activated state, the MAC CE is for deactivating all cells or one or more secondary cells in the SCG.

In a possible design, the MAC CE includes first indication information. The first indication information is a reserved bit whose value is a first value in a payload of the MAC CE.

In a possible design, when a master cell group MCG includes a primary cell and M secondary cells, and the SCG includes the primary secondary cell and N−1 secondary cells, the payload of the MAC CE includes M first bits and N second bits. M is a nonnegative integer, and N is a positive integer. The M first bits are in a one-to-one correspondence with the M secondary cells in the MCG. When a value of the first bit is a second value, the first bit indicates to activate the secondary cell corresponding to the first bit. Alternatively, when a value of the first bit is a third value, the first bit indicates to deactivate the secondary cell corresponding to the first bit. The N second bits are in a one-to-one correspondence with the N cells in the SCG. When a value of the second bit is a second value, the second bit indicates to activate the cell corresponding to the second bit. Alternatively, when a value of the second bit is a third value, the second bit indicates to deactivate the cell corresponding to the second bit.

In a possible design, a subheader of the MAC CE includes an LCID whose value is 57 or 58. Based on this design, a MAC CE for activating/deactivating an SCell in a conventional technology is reused as the MAC CE provided in this application.

In a possible design, a payload of the MAC CE includes one or more third bits, and each third bit corresponds to one SCG. When a value of the third bit is a fourth value, the third bit indicates to activate the SCG corresponding to the third bit. Alternatively, when a value of the third bit is a fifth value, the third bit indicates to deactivate the SCG corresponding to the third bit.

In a possible design, when a subheader of the MAC CE includes an LCID whose value is a second preset value, the MAC CE indicates to deactivate the SCG. Alternatively, when a subheader of the MAC CE includes an LCID whose value is a third preset value, the MAC CE indicates to activate the SCG. Optionally, based on this design, the MAC CE does not include a payload, to reduce signaling overheads.

In a possible design, the configuration method further includes: The first node receives second indication information sent by the terminal. The second indication information indicates that the terminal has a capability of activating or deactivating, based on the MAC CE sent by the first node, the cell in the cell group managed by the second node. Alternatively, the second indication information indicates that the terminal does not have the capability of activating or deactivating, based on the MAC CE sent by the first node, the cell in the cell group managed by the second node.

In a possible design, the configuration method further includes: The first node sends first request information to the terminal. The first request information is for requesting the terminal to report the second indication information.

According to a third aspect, a configuration method is provided, including: A terminal receives fourth indication information, where the fourth indication information indicates to deactivate an SCG, and includes non-contention-based random access configuration information. Then, the terminal receives fifth indication information sent by a master node, where the fifth indication information indicates to activate at least a PSCell in the SCG. The terminal initiates random access to a secondary node based on the non-contention-based random access configuration information.

Based on the foregoing technical solution, on one hand, because the fourth indication information indicating to deactivate the SCG includes the non-contention-based random access configuration information, after receiving the fifth indication information, the terminal may directly initiate random access based on the non-contention-based random access configuration information included in the fourth indication information, without waiting for a network side to deliver the non-contention-based random access configuration information, so that a delay of initiating random access by the terminal is reduced. On the other hand, in comparison with a conventional technology in which the terminal initiates contention-based random access to activate a cell in the SCG, in the technical solution provided in this application, the terminal initiates non-contention-based random access to activate the cell in the SCG, so as to avoid a problem that a random access failure is caused by a conflict and contention, so that random access is completed more quickly, and the cell in the SCG is further activated more quickly.

In a possible design, that a terminal receives fourth indication information includes: The terminal receives the fourth indication information sent by the master node, or the terminal receives the fourth indication information sent by the secondary node.

In a possible design, the non-contention-based random access configuration information includes two-step non-contention-based random access configuration information and/or four-step non-contention-based random access configuration information.

According to a fourth aspect, a configuration method is provided, including: A network device generates fourth indication information. The fourth indication information indicates to deactivate an SCG, and includes non-contention-based random access configuration information. The network device sends the fourth indication information to a terminal.

In a possible design, the network device is a master node or a secondary node.

In a possible design, the non-contention-based random access configuration information includes two-step non-contention-based random access configuration information and/or four-step non-contention-based random access configuration information.

In a possible design, when the network device is a master node, the method further includes: The master node receives the non-contention-based random access configuration information sent by a secondary node.

In a possible design, when the network device is a secondary node, the method further includes: A central unit (central unit, CU) of the secondary node sends second request information to a distributed unit (distributed unit, DU) of the secondary node. The second request information is for requesting the non-contention-based random access configuration information. The CU of the secondary node receives second response information sent by the DU of the secondary node. The second response information includes the non-contention-based random access configuration information.

According to a fifth aspect, a configuration method is provided, including: A terminal receives fifth indication information sent by a master node. The fifth indication information indicates to activate at least a PSCell in an SCG, and includes non-contention-based random access configuration information. The terminal initiates random access to a secondary node based on the non-contention-based random access configuration information.

Based on the foregoing technical solution, on one hand, because the fifth indication information includes the non-contention-based random access configuration information, after receiving the fifth indication information, the terminal may directly initiate random access based on the non-contention-based random access configuration information included in the fifth indication information, without waiting for a network side to deliver the non-contention-based random access configuration information, so that a delay of initiating random access by the terminal is reduced. On the other hand, in comparison with a conventional technology in which the terminal initiates contention-based random access to activate a cell in the SCG, in the technical solution provided in this application, the terminal initiates non-contention-based random access to activate the cell in the SCG, so as to avoid a problem that a random access failure is caused by a conflict and contention, so that random access is completed more quickly, and the cell in the SCG is further activated more quickly.

In a possible design, the non-contention-based random access configuration information includes two-step non-contention-based random access configuration information and/or four-step non-contention-based random access configuration information.

According to a sixth aspect, a configuration method is provided, including: A master node generates fifth indication information, where the fifth indication information indicates to activate at least a PSCell in an SCG, and includes non-contention-based random access configuration information. Then, the master node sends the fifth indication information to a terminal.

In a possible design, the non-contention-based random access configuration information includes two-step non-contention-based random access configuration information and/or four-step non-contention-based random access configuration information.

In a possible design, the method further includes: The master node receives the non-contention-based random access configuration information sent by a secondary node.

According to a seventh aspect, a communication apparatus is provided, including a communication unit, configured to receive a MAC CE sent by a first node, where the MAC CE indicates to activate or deactivate one or more cells in a cell group managed by a second node, and the first node is different from the second node; and a processing unit, configured to activate or deactivate, based on the MAC CE, the one or more cells in the cell group managed by the second node.

In a possible design, the first node is a master node, the second node is a secondary node, and the cell group managed by the second node is an SCG.

In a possible design, the first node is a secondary node, the second node is a master node, and the cell group managed by the second node is an MCG.

In a possible design, when all cells in the SCG are in a deactivated state, the MAC CE is for activating at least a primary secondary cell.

In a possible design, the MAC CE is further for activating at least one secondary cell.

In a possible design, the MAC CE includes first indication information. The first indication information is a reserved bit whose value is a first value in a payload of the MAC CE.

In a possible design, when a master cell group MCG includes a primary cell and M secondary cells, and the SCG includes the primary secondary cell and N−1 secondary cells, the payload of the MAC CE includes M first bits and N second bits. M is a nonnegative integer, and N is a positive integer. The M first bits are in a one-to-one correspondence with the M secondary cells in the MCG. When a value of the first bit is a second value, the first bit indicates to activate the secondary cell corresponding to the first bit. Alternatively, when a value of the first bit is a third value, the first bit indicates to deactivate the secondary cell corresponding to the first bit. The N second bits are in a one-to-one correspondence with the N cells in the SCG. When a value of the second bit is a second value, the second bit indicates to activate the cell corresponding to the second bit. Alternatively, when a value of the second bit is a third value, the second bit indicates to deactivate the cell corresponding to the second bit.

In a possible design, a subheader of the MAC CE includes an LCID whose value is 57 or 58.

In a possible design, a payload of the MAC CE includes one or more third bits, and each third bit corresponds to one SCG. When a value of the third bit is a fourth value, the third bit indicates to activate the SCG corresponding to the third bit. Alternatively, when a value of the third bit is a fifth value, the third bit indicates to deactivate the SCG corresponding to the third bit.

In a possible design, when a subheader of the MAC CE includes an LCID whose value is a second preset value, the MAC CE indicates to deactivate the SCG. Alternatively, when a subheader of the MAC CE includes an LCID whose value is a third preset value, the MAC CE indicates to activate the SCG. Optionally, based on this design, the MAC CE does not include a payload.

In a possible design, the communication unit is further configured to send second indication information to the first node. The second indication information indicates that the terminal has a capability of activating or deactivating, based on the MAC CE sent by the first node, the cell in the cell group managed by the second node. Alternatively, the second indication information indicates that the terminal does not have the capability of activating or deactivating, based on the MAC CE sent by the first node, the cell in the cell group managed by the second node.

In a possible design, the communication unit is further configured to receive first request information sent by the first node. The first request information is for requesting the terminal to report the second indication information.

According to an eighth aspect, a communication apparatus is provided. The communication apparatus is used in a first node, and includes: a processing unit, configured to generate a MAC CE, where the MAC CE is for activating or deactivating one or more cells in a cell group managed by a second node, and the first node is different from the second node; and a communication unit, configured to send the MAC CE to a terminal.

In a possible design, the first node is a master node, the second node is a secondary node, and the cell group managed by the second node is an SCG.

In a possible design, the first node is a secondary node, the second node is a master node, and the cell group managed by the second node is an MCG.

In a possible design, when all cells in the SCG are in a deactivated state, the MAC CE is for activating at least a primary secondary cell.

In a possible design, the MAC CE is further for activating at least one secondary cell.

In a possible design, when a primary secondary cell in the SCG is in an activated state, the MAC CE is for deactivating all cells or one or more secondary cells in the SCG.

In a possible design, the MAC CE includes first indication information. The first indication information is a reserved bit whose value is a first value in a payload of the MAC CE.

In a possible design, when a master cell group MCG includes a primary cell and M secondary cells, and the SCG includes the primary secondary cell and N−1 secondary cells, the payload of the MAC CE includes M first bits and N second bits. M is a nonnegative integer, and N is a positive integer. The M first bits are in a one-to-one correspondence with the M secondary cells in the MCG. When a value of the first bit is a second value, the first bit indicates to activate the secondary cell corresponding to the first bit. Alternatively, when a value of the first bit is a third value, the first bit indicates to deactivate the secondary cell corresponding to the first bit. The N second bits are in a one-to-one correspondence with the N cells in the SCG. When a value of the second bit is a second value, the second bit indicates to activate the cell corresponding to the second bit. Alternatively, when a value of the second bit is a third value, the second bit indicates to deactivate the cell corresponding to the second bit.

In a possible design, a subheader of the MAC CE includes an LCID whose value is 57 or 58.

In a possible design, a payload of the MAC CE includes one or more third bits, and each third bit corresponds to one SCG. When a value of the third bit is a fourth value, the third bit indicates to activate the SCG corresponding to the third bit. Alternatively, when a value of the third bit is a fifth value, the third bit indicates to deactivate the SCG corresponding to the third bit.

In a possible design, when a subheader of the MAC CE includes an LCID whose value is a second preset value, the MAC CE indicates to deactivate the SCG. Alternatively, when a subheader of the MAC CE includes an LCID whose value is a third preset value, the MAC CE indicates to activate the SCG. Optionally, based on this design, the MAC CE does not include a payload.

In a possible design, the communication unit is further configured to receive second indication information sent by the terminal. The second indication information indicates that the terminal has a capability of activating or deactivating, based on the MAC CE sent by the first node, the cell in the cell group managed by the second node. Alternatively, the second indication information indicates that the terminal does not have the capability of activating or deactivating, based on the MAC CE sent by the first node, the cell in the cell group managed by the second node.

According to a ninth aspect, a communication apparatus is provided, including: a communication unit, configured to receive fourth indication information, where the fourth indication information indicates to deactivate an SCG, and includes non-contention-based random access configuration information, where the communication unit is further configured to receive fifth indication information sent by a master node, where the fifth indication information indicates to activate at least a PSCell in the SCG; and a processing unit, configured to initiate random access to a secondary node based on the non-contention-based random access configuration information.

In a possible design, the communication unit is specifically configured to receive the fourth indication information sent by the master node, or receive the fourth indication information sent by the secondary node.

In a possible design, the non-contention-based random access configuration information includes two-step noncontention-based random access configuration information and/or four-step non-contention-based random access configuration information.

According to a tenth aspect, a communication apparatus is provided, including: a processing unit, configured to generate fourth indication information, where the fourth indication information indicates to deactivate an SCG, and includes non-contention-based random access configuration information; and a communication unit, configured to send the fourth indication information to a terminal.

In a possible design, the communication apparatus is a master node or a secondary node.

In a possible design, the non-contention-based random access configuration information includes two-step non-contention-based random access configuration information and/or four-step non-contention-based random access configuration information.

In a possible design, when the communication apparatus is a master node, the communication unit is specifically configured to receive the non-contention-based random access configuration information sent by a secondary node.

In a possible design, when the communication apparatus is a secondary node, a CU of the secondary node sends second request information to a DU of the secondary node. The second request information is for requesting the non-contention-based random access configuration information. The CU of the secondary node receives second response information sent by the DU of the secondary node. The second response information includes the non-contention-based random access configuration information.

According to an eleventh aspect, a communication apparatus is provided, including: a communication apparatus, configured to receive fifth indication information sent by a master node, where the fifth indication information indicates to activate at least a PSCell in an SCG, and includes non-contention-based random access configuration information; and a processing unit, configured to initiate random access to a secondary node based on the non-contention-based random access configuration information.

In a possible design, the non-contention-based random access configuration information includes two-step non-contention-based random access configuration information and/or four-step non-contention-based random access configuration information.

According to a twelfth aspect, a communication apparatus is provided, including: a processing unit, configured to generate fifth indication information, where the fifth indication information indicates to activate at least a PSCell in an SCG, and includes non-contention-based random access configuration information; and a communication unit, configured to send the fifth indication information to a terminal.

In a possible design, the non-contention-based random access configuration information includes two-step non-contention-based random access configuration information and/or four-step non-contention-based random access configuration information.

In a possible design, the communication unit is further configured to receive the non-contention-based random access configuration information sent by a secondary node.

According to a thirteenth aspect, a communication apparatus is provided, including a processor. The processor is configured to be coupled to a memory, read instructions in the memory, and implement, based on the instructions, the configuration method in any one of the first aspect to the sixth aspect.

According to a fourteenth aspect, a computer-readable storage medium is provided. The computer-readable storage medium stores instructions, and when the instructions are run on a communication apparatus, the communication apparatus is enabled to perform the configuration method in any one of the first aspect to the sixth aspect.

According to a fifteenth aspect, a computer program product including instructions is provided. When the computer program product runs on a communication apparatus, the communication apparatus is enabled to perform the configuration method in any one of the first aspect to the fifth aspect.

According to a sixteenth aspect, a chip is provided. The chip includes a processing module and a communication interface. The communication interface is configured to receive an input signal and provide the input signal to the processing module, and/or is configured to output a signal generated by the processing module. The processing module is configured to perform the configuration method in any one of the first aspect to the sixth aspect.

In an implementation, the processing module may run code instructions to perform the configuration method in any one of the first aspect to the sixth aspect. The code instructions may be from a memory inside the chip, or may be from a memory outside the chip. Optionally, the processing module may be a processor, a microprocessor, or an integrated circuit integrated on the chip. The communication interface may be an input/output circuit or a transceiver pin on the chip.

According to a seventeenth aspect, a communication system is provided, including a terminal and a network device. The terminal is configured to perform the configuration method in the first aspect. The network device is configured to perform the configuration method in the second aspect.

According to an eighteenth aspect, a communication system is provided, including a terminal and a network device. The terminal is configured to perform the configuration method in the third aspect. The network device is configured to perform the configuration method in the fifth aspect.

According to a nineteenth aspect, a communication system is provided, including a terminal and a network device. The terminal is configured to perform the configuration method in the fourth aspect. The network device is configured to perform the configuration method in the sixth aspect.

For technical effects brought by any design manner in the seventh aspect to the nineteenth aspect, refer to the technical effects in the corresponding method provided above, which are the same as the technical effects brought by the design manner. Details are not described herein again.

DESCRIPTION OF EMBODIMENTS

Figure 1:
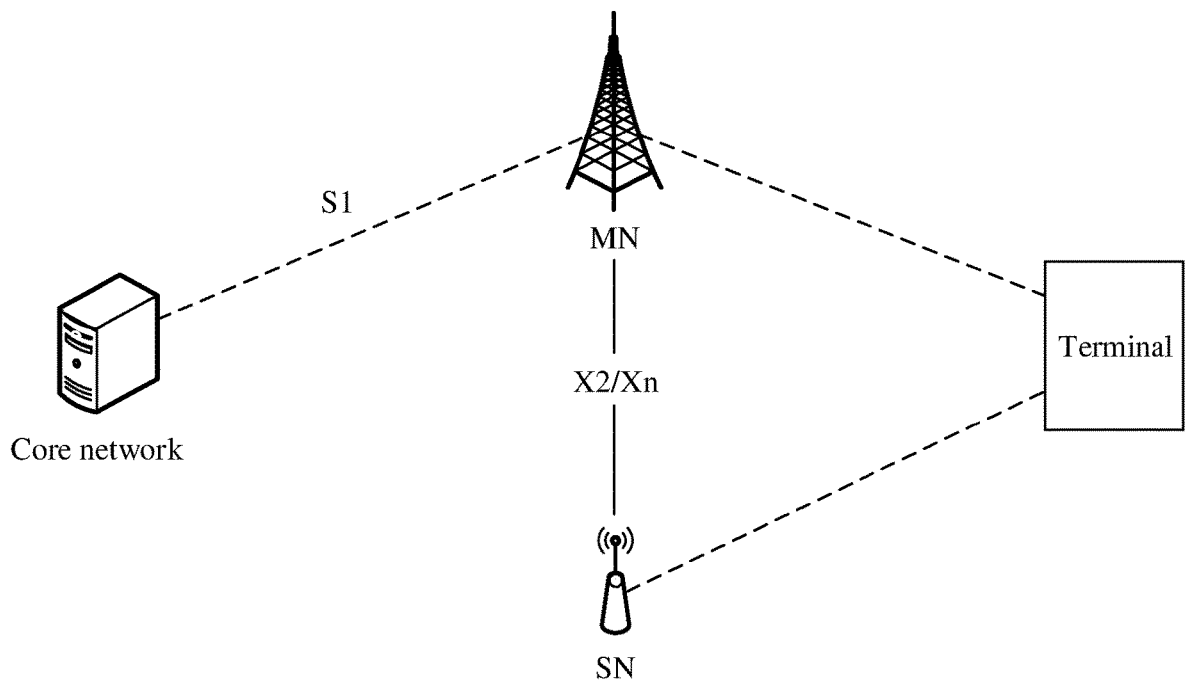
FIG. 1 is a schematic diagram of an architecture of a communication system according to an embodiment of this application.

The following describes the technical solutions in embodiments of this application with reference to the accompanying drawings in embodiments of this application.

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, words such as "example" or "for example" are used for representing giving an example, an illustration, or a description. Any embodiment or design scheme described as an "example" or "for example" in this application should not be explained as being more preferred or having more advantages than another embodiment or design scheme. Exactly, use of the word "example" or "for example" is intended to present a related concept in a specific manner.

In the descriptions of this application, the "indication" may include a direct indication and an indirect indication, or may include an explicit indication and an implicit indication. Information indicated by a piece of information (for example, first indication information described below) is referred to as to-be-indicated information. In a specific implementation process, there are a plurality of manners of indicating the to-be-indicated information. For example, the to-be-indicated information may be directly indicated, where the to-be-indicated information, an index of the to-be-indicated information, or the like is indicated. For another example, the to-be-indicated information may be indirectly indicated by indicating other information. There is an association relationship between the other information and the to-be-indicated information. For another example, only a part of the to-be-indicated information may be indicated, and the other part of the to-be-indicated information is already known or pre-agreed on. In addition, specific information may also be indicated by using a pre-agreed (for example, stipulated in a protocol) arrangement sequence of various pieces of information, to reduce indication overheads to some extent.

To facilitate understanding of technical solutions of this application, the following first briefly describes terms used in this application.

1. Random Access

Random access is a process in which a terminal establishes a connection to a network device before entering a connected/activated state from an idle/deactivated state. A main purpose of random access is to establish uplink synchronization, and request the network device to allocate an uplink resource to the terminal, so that the terminal can perform corresponding data transmission by using the uplink resource.

Random access includes a contention-based random access procedure and a non-contention-based random access procedure. In comparison with the contention-based random access procedure, a greatest difference of the non-contention-based random access procedure lies in that a preamble for random access is allocated by a network side rather than being generated by a terminal side, so that contention and a conflict resolution process are reduced.

The non-contention-based random access procedure may be divided into two-step non-contention-based random access and four-step non-contention-based random access based on a quantity of steps needed for completing the random access procedure.

2. Activating (Activating) a Cell

In embodiments of this application, "activating a cell" may be understood as "keeping the cell in an activated state (activation)" or "resuming the cell (resume)".

When a cell is in the activated state, that a terminal activates the cell is equivalent to that the terminal keeps the cell in the activated state. When a cell is in a deactivated state, that a terminal activates the cell is equivalent to that the terminal switches the cell from the deactivated state to the activated state.

3. Deactivating (Deactivating) a Cell

In embodiments of this application, "deactivating a cell" may be understood as "keeping the cell in a deactivated state (deactivation)" or "suspending the cell (suspend)".

When a cell is in an activated state, that a terminal deactivates the cell is equivalent to that the terminal switches the cell from the activated state to the deactivated state. When a cell is in the deactivated state, that a terminal deactivates the cell is equivalent to that the terminal keeps the cell in the deactivated state.

It should be noted that, that a terminal deactivates a cell does not mean that a network side "closes" the cell, but means that the cell suspends receiving/transmitting data related to the terminal.

In addition, for a terminal, when a cell is in the deactivated state, the terminal does not need to receive a PDCCH or physical downlink shared channel (physical downlink shared channel, PDSCH) corresponding to the cell, cannot send uplink data in the cell, and does not need to perform channel quality indicator (channel quality indicator, CQI) measurement of the cell.

A configuration method provided in embodiments of this application may be applied to a communication system shown in FIG. 1. As shown in FIG. 1, the communication system includes a terminal, a master node (master node, MN), a secondary node (secondary node, SN), and a core network.

The terminal may support dual connectivity (Dual Connectivity, DC), and establish a wireless connection to both the master node and the secondary node. In this way, the master node and the secondary node may jointly provide a data transmission service for the terminal.

The master node is connected to the core network (core network, CN) through an S1/NG interface. At least a control plane connection is included between the master node and the core network, and a user plane connection may be further included. The S1 interface includes an S1-U/NG-U and an S1-C/NG-C. The S1-U/NG-U represents the user plane connection, and the S1-C/NG-C represents the control plane connection. The secondary node may or may not have a user plane connection to the core network. When there is no user plane connection between the secondary node and the core network, data of the terminal may be offloaded by the master node to the secondary node at a packet data convergence protocol (packet data convergence protocol, PDCP) layer. The master node may also be referred to as a master base station or a master access network device, and the SN may also be referred to as a secondary base station or a secondary access network device.

In a dual connectivity scenario, the master node manages a primary cell (primary cell, PCell). The primary cell is a cell that is deployed on a primary frequency and that is accessed by the terminal when the terminal initiates an initial connection establishment process or an RRC connection reestablishment process, or a cell that is indicated as the primary cell in a handover process.

Further, in addition to the primary cell, the master node may further manage one or more secondary cells (secondary cells, SCells). Cells that are associated with the master node and that serve the terminal, for example, the primary cell and the secondary cell of the master node, may be collectively referred to as an MCG.

The secondary node manages a primary secondary cell (primary secondary cell, PSCell). The primary secondary cell may be a cell accessed by the terminal when the terminal initiates a random access process to the secondary node, a cell that is on another secondary node and to which the terminal initiates data transmission when the terminal skips the random access process in a secondary node change process, or a cell on a secondary node accessed by the terminal when the terminal initiates the random access process when performing a synchronization reconfiguration process.

Further, in addition to the primary secondary cell, the secondary node may further manage one or more secondary cells. Cells that are associated with the secondary node and that serve the terminal, for example, the primary secondary cell and the secondary cell on the secondary node, may be collectively referred to as an SCG.

For ease of description, in an NR protocol, the primary cell and the primary secondary cell are collectively referred to as a special cell (special cell, SpCell).

The master node and the secondary node may be collectively referred to as a network device. The network device includes but is not limited to: an access point (access point, AP) in a wireless fidelity (wireless fidelity, Wi-Fi) system, such as a home gateway, a router, a server, a switch, and a bridge, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), a wireless relay node, a wireless backhaul node, a transmission point (transmission reception point, TRP, or transmission point, TP), or the like. The network device may alternatively be a gNB or a transmission point (TRP or TP) in a 5G system, for example, a new radio (new radio, NR) system, or one antenna panel or a group of antenna panels (including a plurality of antenna panels) of a base station in a 5G system. The network device may alternatively be a network node, such as a baseband unit (baseband unit, BBU), a DU, or a road side unit (road side unit, RSU) having a base station function, that constitutes a gNB or a transmission point.

In embodiments of this application, the network device may use a CU-DU architecture. In other words, the network device may include a CU and at least one DU. In this case, some functions of the network device are deployed on the CU, and the other functions of the network device are deployed on the DU. The functions of the CU and the DU are divided based on a protocol stack. In an implementation, a radio resource control (radio Resource Control, RRC) layer, a PDCP layer, and a service data adaptation protocol (service data adaptation protocol, SDAP) layer in a protocol stack are deployed on the CU. A radio link control (radio link control, RLC) layer, a media access control (media access control, MAC) layer, and a physical layer (physical layer, PHY) in the protocol stack are deployed on the DU. Therefore, the CU is capable of processing the RRC layer, the PDCP layer, and the SDAP layer. The DU is capable of processing the RLC layer, the MAC layer, and the PHY layer. It may be understood that the foregoing function division is merely an example, and does not constitute a limitation on the CU and the DU. In other words, the functions may alternatively be divided between the CU and the DU in another manner. Details are not described herein in embodiments of this application.

Based on communication standards separately supported by the master node and the secondary node, a dual connectivity network may be implemented in a plurality of manners. The following uses examples for description.

Figure 2A:
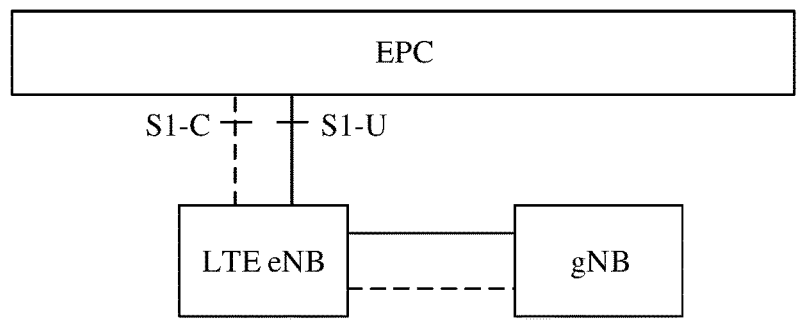
FIG. 2(a) and FIG. 2(b) are a schematic diagram of an architecture of a dual connectivity network according to an embodiment of this application.
Figure 2B:
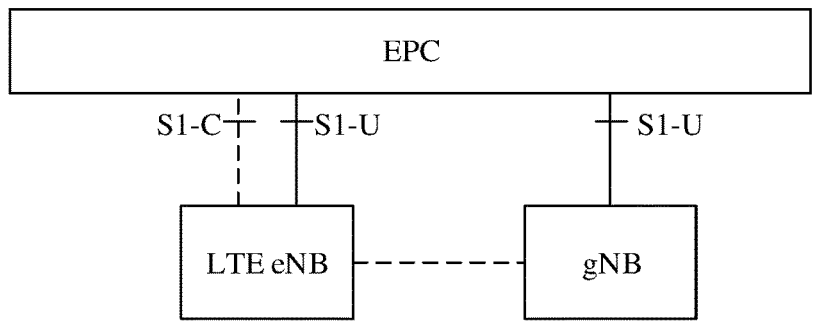

FIG. 2(a) and FIG. 2(b) are a schematic diagram of an LTE-NR dual connectivity (E-UTRA-NR Dual Connectivity, EN-DC) network. The EN-DC network is dual connectivity between a 4G radio access network and 5G NR. An LTE base station (LTE eNB) functions as an MN, and an NR base station (NR gNB) functions as an SN. As shown in FIG. 2(a), there is an S1 interface between the LTE eNB and an evolved packet core (evolved Packet Core, EPC) in an LTE system. At least a control plane connection is included, and a user plane connection may be further included. As shown in FIG. 2(b), there is an S1-U interface between the NR gNB and an EPC. That is, only a user plane connection may be included.

Figure 3A:
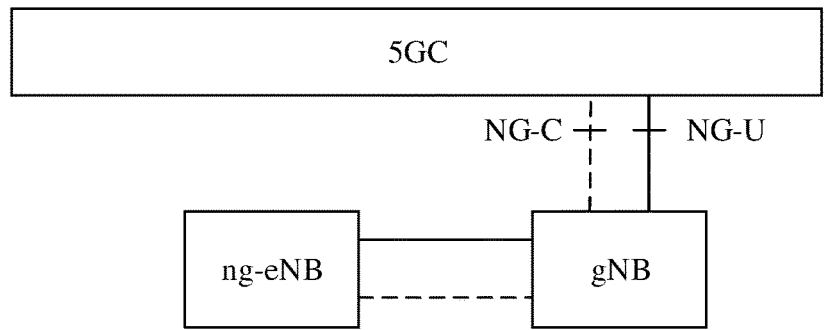
FIG. 3(a) and FIG. 3(b) are a schematic diagram of an architecture of a dual connectivity network according to an embodiment of this application.
Figure 3B:
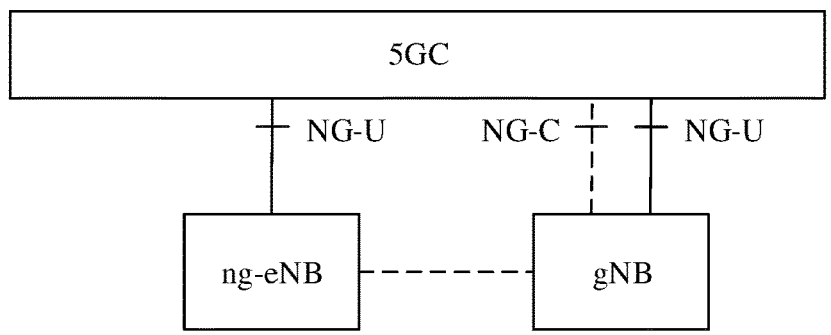

FIG. 3(a) and FIG. 3(b) are a schematic diagram of an NR-LTE dual connectivity (NR-E-UTRA Dual Connectivity, NE-DC) network. The NE-DC network is dual connectivity between a 4G radio access network and 5G NR in a 5G core network. An NR base station (gNB) functions as an MN, an LTE base station (ng-eNB) functions as an SN, and both the MN and the SN are connected to the 5G core network (5th Generation Core Network, 5GC). As shown in FIG. 3(a), there is an NG interface between the gNB and the 5GC, and a control plane connection and a user plane connection may be established for a terminal. The ng-eNB sends user plane data to the 5GC by using the gNB. As shown in FIG. 3(b), there is an NG-U interface between the ng-eNB and the 5GC. Only a user plane connection is established for a terminal. The ng-eNB directly sends user plane data to the 5GC.

Figure 4A:
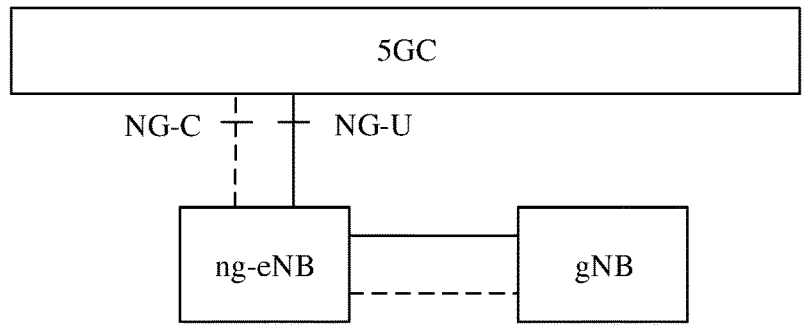
FIG. 4(a) and FIG. 4(b) are a schematic diagram of an architecture of a dual connectivity network according to an embodiment of this application.
Figure 4B:
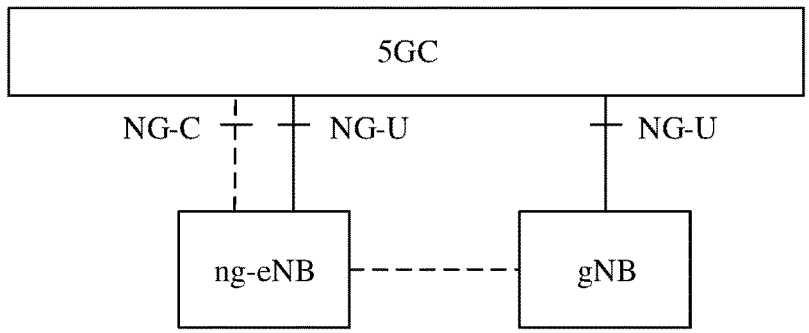

FIG. 4(a) and FIG. 4(b) are a schematic diagram of a 5G core network LTE-NR dual connectivity (Next Generation E-UTRA-NR Dual Connectivity, NGEN-DC) network. The NGEN-DC network is dual connectivity between a 4G radio access network and 5G NR in a 5G core network. An LTE base station (ng-eNB) functions as an MN, an NR base station (gNB) functions as an SN, and both the MN and the SN are connected to the 5GC. As shown in FIG. 4(*a*), there is an NG interface between the ng-eNB and the 5GC, and a control plane connection and a user plane connection may be established for a terminal. The gNB sends user plane data to the 5GC by using the ng-eNB. As shown in FIG. 4(*b*), there is an NG-U interface between the gNB and the 5GC. Only a user plane connection is established for a terminal. The gNB directly sends user plane data to the 5GC.

In the dual connectivity networks in FIG. 2(*a*) to FIG. 4(*b*), a user plane connection may alternatively not be established between the SN and the core network, but data is transmitted through the MN. For example, in a downlink direction, data of the terminal arrives at the MN, and then the MN distributes, at a PDCP layer, the data of the terminal to the SN, where a form of the distributed data is, for example, a PDCP protocol data unit (Protocol Data Unit, PDU).

It may be understood that the communication method provided in embodiments of this application may be applied to conventional LTE dual connectivity, or may be applied to the EN-DC network, the NE-DC network, or the NGEN-DC network in a 5G system. The communication method may alternatively be applied to 5G core network NR-NR dual connectivity (NR-NR Dual Connectivity, NR-DC) and another future DC architecture. A specific architecture of a dual connectivity network to which the communication method is applied is not limited in embodiments of this application. FIG. 2(*a*) to FIG. 4(*b*) are merely used as examples for description herein. In the following embodiments, an EN-DC network architecture is used as an example to describe the method provided in embodiments of this application. The terminal is a device that has a wireless transceiver function. The terminal may be deployed on land, including an indoor or outdoor device, a handheld device, or a vehicle-mounted device, or may be deployed on a water surface (for example, on a ship), or may be deployed in air (for example, on an aircraft, a balloon, or a satellite). The terminal may be user equipment (user equipment, UE). The UE includes a handheld device, a vehicle-mounted device, a wearable device, or a computing device that has a wireless communication function. For example, the UE may be a mobile phone (mobile phone), a tablet computer, or a computer having a wireless transceiver function. Alternatively, the terminal may be a virtual reality (virtual reality, VR) terminal device, an augmented reality (augmented reality, AR) terminal device, a wireless terminal in industrial control, a wireless terminal in self-driving, a wireless terminal in telemedicine, a wireless terminal in a smart grid, a wireless terminal in a smart city (smart city), a wireless terminal in a smart home (smart home), or the like. In embodiments of this application, an apparatus for implementing a function of the terminal may be a terminal, or may be an apparatus that can support the terminal in implementing the function, for example, a chip system. In this embodiment of this application, the chip system may include a chip, or may include a chip and another discrete component. In embodiments of this application, an example in which the apparatus configured to implement the function of the terminal is the terminal is used to describe the technical solutions provided in embodiments of this application.

Figure 5:
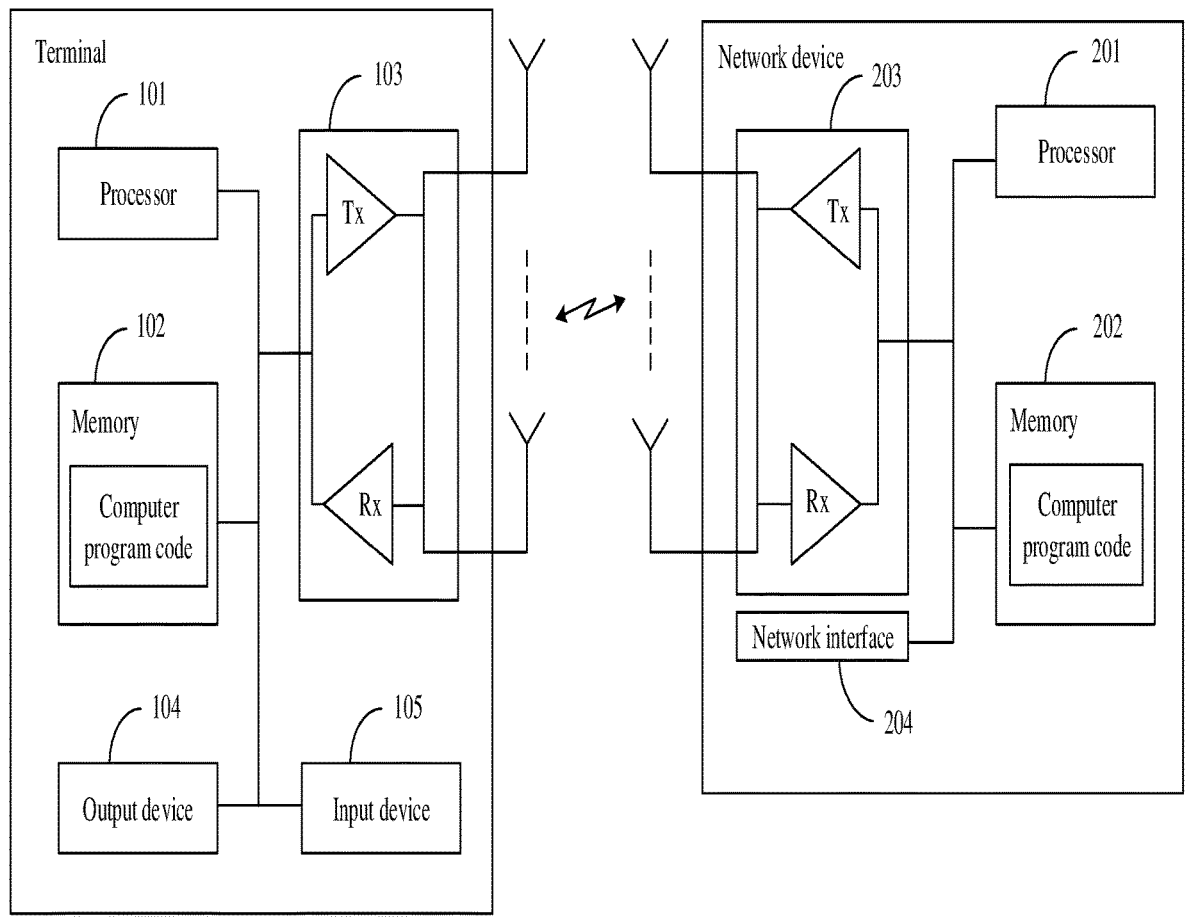
FIG. 5 is a schematic diagram of hard structures of a terminal and a network device according to an embodiment of this application.

FIG. 5 is a schematic diagram of hardware structures of a network device and a terminal according to an embodiment of this application.

The terminal includes at least one processor 101 and at least one transceiver 103. Optionally, the terminal may further include an output device 104, an input device 105, and at least one memory 102.

The processor 101, the memory 102, and the transceiver 103 are connected through a bus. The processor 101 may be a general-purpose central processing unit (central processing unit, CPU), a microprocessor, an application-specific integrated circuit (application-specific integrated circuit, ASIC), or one or more integrated circuits configured to control program execution of the solutions of this application. The processor 101 may further include a plurality of CPUs, and the processor 101 may be a single-core (single-CPU) processor or a multi-core (multi-CPU) processor. The processor herein may be one or more devices, circuits, or processing cores configured to process data (for example, computer program instructions).

The memory 102 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. This is not limited in this embodiment of this application. The memory 102 may exist independently, and is connected to the processor 101 through the bus. Alternatively, the memory 102 may be integrated with the processor 101. The memory 102 is configured to store application program code for performing the solutions in this application, and the processor 101 controls the execution. The processor 101 is configured to execute the computer program code stored in the memory 102, to implement the method provided in embodiments of this application.

The transceiver 103 may use any apparatus such as a transceiver, and is configured to communicate with another device or a communication network such as the Ethernet, a radio access network (radio access network, RAN), or a wireless local area network (wireless local area networks, WLAN). The transceiver 103 includes a transmitter Tx and a receiver Rx.

The output device 104 communicates with the processor 101, and may display information in a plurality of manners. For example, the output device 104 may be a liquid crystal display (liquid crystal display, LCD), a light emitting diode (light emitting diode, LED) display device, a cathode ray tube (cathode ray tube, CRT) display device, or a projector (projector). The input device 105 communicates with the processor 101, and may receive an input of a user in a plurality of manners. For example, the input device 105 may be a mouse, a keyboard, a touchscreen device, or a sensor device.

The network device includes at least one processor 201, at least one memory 202, at least one transceiver 203, and at least one network interface 204. The processor 201, the memory 202, the transceiver 203, and the network interface 204 are connected through a bus. The network interface 204 is configured to be connected to a core network device through a link (for example, an S1 interface), or connected to a network interface of another network device through a wired or wireless link (for example, an X2 interface) (not shown in the figure). This is not specifically limited in this embodiment of this application. In addition, for related descriptions of the processor 201, the memory 202, and the transceiver 203, refer to the descriptions of the processor 101, the memory 102, and the transceiver 103 in the terminal. Details are not described herein again.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

The network device may indicate, by using a MAC CE carried on a PDCCH, the terminal to perform SCell activation/deactivation. The MAC CE has two formats (which are the following format 1 and format 2).

Figure 6:
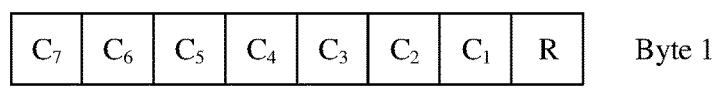
FIG. 6 is a schematic diagram of a MAC CE in a conventional technology.

As shown in FIG. 6, a payload of a MAC CE in the format 1 includes eight bits. Specifically, the payload of the MAC CE includes seven cell fields (C-fields) and one reserved bit (reserved bit). The reserved bit is generally set to 0. A value of an LCID in a subheader of the MAC CE in the format 1 is 58.

Figures 7, 8:
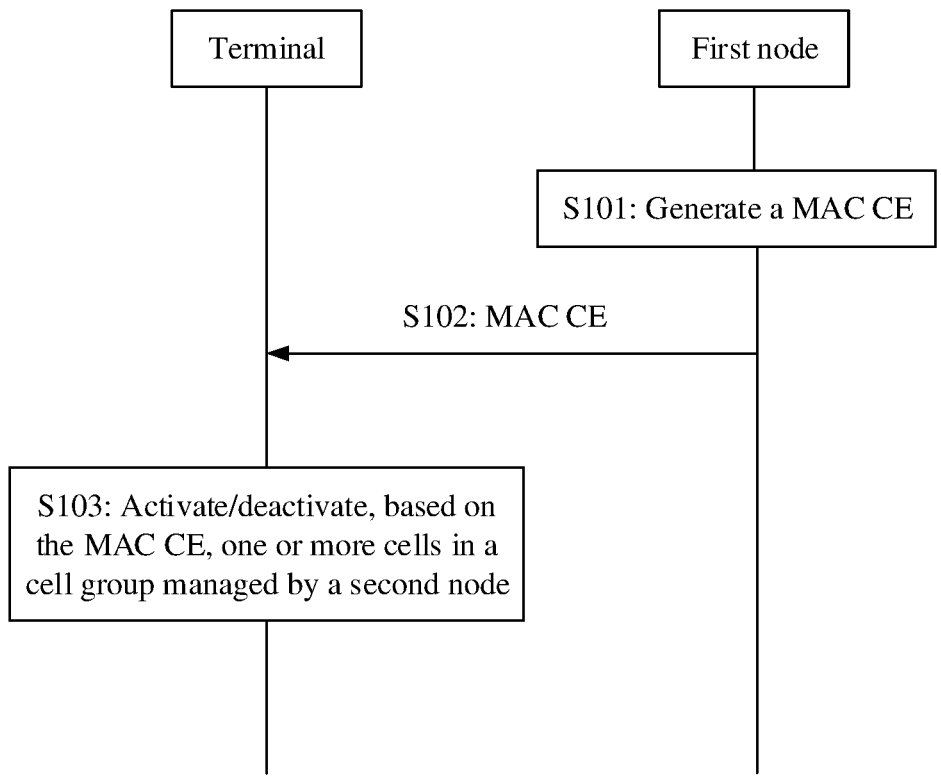
FIG. 7 is a schematic diagram of another MAC CE in a conventional technology.
FIG. 8 is a flowchart of a configuration method according to an embodiment of this application.

As shown in FIG. 7, a payload of a MAC CE in the format 2 includes 32 bits. Specifically, the payload of the MAC CE includes 31 C-fields and one reserved bit. A value of an LCID in a subheader of the MAC CE in the format 2 is 57.

For ease of description, the C-field in the MAC CE may be numbered $C_i$, where i represents a sequence number of the C-field in the MAC CE. Using the MAC CE in the format 1 as an example, the seven C-fields may be respectively numbered from $C_1$ to $C_7$. Using the MAC CE in the format 2 as another example, the 31 C-fields may be respectively numbered from $C_1$ to $C_{31}$.

In a dual connectivity scenario, the terminal is configured with a MAC entity (entity) corresponding to an MCG and a MAC entity corresponding to an SCG. The MAC entity corresponding to the MCG is responsible for processing a MAC CE for communication between the terminal and a master node. The MAC entity corresponding to the SCG is responsible for processing a MAC CE for communication between the terminal and a secondary node.

When the MAC entity corresponding to the SCG receives a MAC CE that is sent by the secondary node and that is for activating/deactivating an SCell, the MAC entity corresponding to the SCG parses the MAC CE in the following manner: When a secondary cell with a secondary cell index (SCellIndex) i is configured for the MAC entity corresponding to the SCG, a field $C_i$ in the MAC CE indicates that the secondary cell with the SCellIndex i is in an activated/deactivated state. Alternatively, when no secondary cell with the secondary cell index (SCellIndex) i is configured for the MAC entity corresponding to the SCG, the MAC entity corresponding to the SCG ignores (ignore) the field $C_i$ in the MAC CE. When the field $C_i$ is set to 1, it indicates that the secondary cell with the SCellIndex i is to be activated. When the field $C_i$ is set to 0, it indicates that the secondary cell with the SCellIndex i is to be deactivated.

In other words, for the terminal, the MAC CE that is delivered by the secondary node and that is for activating/deactivating an SCell can be used to activate/deactivate only a cell in the SCG, but cannot be used to activate/deactivate a cell in the MCG.

When the MAC entity corresponding to the MCG receives a MAC CE that is sent by the master node and that is for activating/deactivating an SCell, the MAC entity corresponding to the MCG parses the MAC CE in the following manner: When a secondary cell with a secondary cell index (SCellIndex) i is configured for the MAC entity corresponding to the MCG, a field $C_i$ in the MAC CE indicates that the secondary cell with the SCellIndex i is in an activated/deactivated state. Alternatively, when no secondary cell with the secondary cell index (SCellIndex) i is configured for the MAC entity corresponding to the MCG, the MAC entity corresponding to the MCG ignores (ignore) the field $C_i$ in the MAC CE.

In other words, for the terminal, the MAC CE that is delivered by the master node and that is for activating/deactivating an SCell can be used to activate/deactivate only a cell in the MCG, but cannot be used to activate/deactivate a cell in the SCG.

It can be learned that the foregoing design of the MAC CE is not flexible enough, and cannot satisfy some management requirements of a network side on the SCG and/or the MCG. For example, in a scenario in which the SCG is deactivated, the master node cannot indicate, by sending a MAC CE, the terminal to activate a cell in the SCG.

To resolve the foregoing technical problem, an embodiment of this application provides a configuration method. As shown in FIG. 8, the method includes the following steps.

S101: A first node generates a MAC CE.

The MAC CE is for activating or deactivating one or more cells in a cell group managed by a second node, and the first node is different from the second node.

In a possible design, the first node is a master node, the second node is a secondary node. Therefore, a cell group managed by the first node is an MCG, and the cell group managed by the second node is an SCG.

In a possible design, the first node is a secondary node, the second node is a master node. Therefore, a cell group managed by the first node is an SCG, and the cell group managed by the second node is an MCG.

It should be noted that an SCell in the SCG is allowed to be switched from the deactivated state to the activated state only when a PSCell in the SCG is switched from a deactivated state to an activated state. Therefore, when the first node is a master node, when all cells in the SCG are in the deactivated state, the MAC CE is for activating at least a PSCell. The MAC CE may be further for activating at least one SCell. The at least one SCell may include an SCell in the SCG and/or an SCell in the MCG.

It should be noted that when a PSCell in the SCG is switched from the activated state to the deactivated state, all SCells in the SCG are switched from the activated state to the deactivated state. Therefore, when the first node is a master node, when the PSCell in the SCG is in the activated state, the MAC CE is for deactivating the SCG.

It should be noted that when a PSCell in the SCG is in the activated state, an SCell in the SCG may be switched from the activated state to the deactivated state, or may be switched from the deactivated state to the activated state. Therefore, when the first node is a master node, when the PSCell in the SCG is in the activated state, the MAC CE is for deactivating or activating one or more SCells in the SCG.

S102: The first node sends the MAC CE to a terminal. Correspondingly, the terminal receives the MAC CE sent by the first node.

When the first node is a master node, a MAC entity corresponding to an MCG of the terminal receives the MAC CE sent by the master node. Alternatively, when the first node is the secondary node, a MAC entity corresponding to an SCG of the terminal receives the MAC CE sent by the secondary node.

S103: The terminal activates or deactivates, based on the MAC CE, the one or more cells in the cell group managed by the second node.

The following describes different implementations of the MAC CE provided in this embodiment of this application. Implementation 1 is applicable to a scenario in which the first node is a master node or a secondary node. Implementation 2 is applicable only to a scenario in which the first node is a master node.

Implementation 1: The MAC CE includes first indication information. The first indication information is a reserved bit whose value is a first value in a payload of the MAC CE. Optionally, the first value may be 1.

Based on Implementation 1, when the MCG includes one PCell and M SCells, and the SCG includes the PSCell and N−1 SCells, the payload of the MAC CE further includes M first bits and N second bits. M is a nonnegative integer, and N is a positive integer.

The M first bits are in a one-to-one correspondence with the M SCells in the MCG. A value of each first bit indicates to activate/deactivate an SCell corresponding to the first bit. For example, when the value of the first bit is a second value, the first bit indicates to activate the SCell corresponding to the first bit. Alternatively, when the value of the first bit is a third value, the first bit indicates to deactivate the SCell corresponding to the first bit. Optionally, the second value may be 1, and the third value may be 0. Alternatively, the second value may be 0, and the third value may be 1.

During actual application, values of the M first bits are determined based on an actual requirement (for example, a requirement of the terminal on a network speed). For example, the values of the M first bits may all be the second value. Alternatively, the values of the M first bits may all be the third value. Alternatively, values of a part of the M first bits are the second value, and values of the other part of the first bits are the third value.

The N second bits are in a one-to-one correspondence with the N cells in the SCG. The N cells include the PSCell and the N−1 SCells. A value of the second bit indicates to activate/deactivate a cell corresponding to the second bit. For example, when the value of the second bit is a second value, the second bit indicates to activate the cell corresponding to the second bit. Alternatively, when a value of the second bit is a third value, the second bit indicates to deactivate the cell corresponding to the second bit.

During actual application, values of the N second bits are determined based on an actual requirement. For example, the values of the N second bits may all be the second value. Alternatively, the values of the N second bits may all be the third value. Alternatively, values of a part of the N second bits are the second value, and values of the other part of the second bits are the third value.

In this embodiment of this application, a correspondence between a bit and a cell, for example, a correspondence between the first bit and the secondary cell in the MCG or a correspondence between the second bit and the cell in the SCG may be specifically implemented as a correspondence between a number of the bit and an index of the cell. For example, a bit numbered $C_i$ corresponds to a cell whose index is i, where i may be a nonnegative integer.

Optionally, it can be negotiated between a network device and the terminal or predefined in a communication protocol that, in a subheader of the MAC CE sent by the first node, a bit corresponding to a cell in the cell group managed by the first node is an invalid bit.

For example, when the first node is a master node, the M first bits in the payload of the MAC CE are invalid bits. In this case, the terminal ignores the M first bits in the payload of the MAC CE. In other words, regardless of the values of the M first bits, the terminal does not change a status of the SCell in the MCG.

For another example, when the first node is a secondary node, the N second bits in the payload of the MAC CE are invalid bits. In this case, the terminal ignores the N second bits in the payload of the MAC CE. In other words, regardless of the values of the N second bits, the terminal does not change a status of the cell in the SCG.

Optionally, it can be negotiated between a network device and the terminal or predefined in a communication protocol that, in a subheader of the MAC CE sent by the first node, a bit corresponding to a cell in the cell group managed by the first node is a valid bit.

For example, when the first node is a master node, the M first bits in the payload of the MAC CE are valid bits. In this case, the terminal reads the M first bits in the payload of the MAC CE, and performs a corresponding activation/deactivation operation on the SCell in the MCG based on the values of the M first bits.

For another example, when the first node is a secondary node, the N second bits in the payload of the MAC CE are valid bits. In this case, the terminal reads the N second bits in the payload of the MAC CE, and performs a corresponding activation/deactivation operation on the cell in the SCG based on the values of the N second bits.

Optionally, based on Implementation 1, the MAC CE provided in this embodiment of this application may be the MAC CE that is for activating/deactivating an SCell and that is described in FIG. 6 or FIG. 7. In this case, a value of an LCID in the subheader of the MAC CE provided in this embodiment of this application is 57 or 58.

Optionally, based on Implementation 1, the MAC CE provided in this embodiment of this application may alternatively not be the MAC CE that is for activating/deactivating an SCell and that is described in FIG. 6 or FIG. 7. In this case, the value of the LCID in the subheader of the MAC CE provided in this embodiment of this application is a value other than 57 or 58.

Implementation 2: A payload of the MAC CE includes one or more third bits, and each third bit corresponds to one SCG. A value of the third bit indicates to activate or deactivate an SCG corresponding to the third bit. For example, when the value of the third bit is a fourth value, the third bit indicates to activate the SCG corresponding to the third bit. Alternatively, when a value of the third bit is a fifth value, the third bit indicates to deactivate the SCG corresponding to the third bit.

Optionally, the fourth value may be 1, and the fifth value may be 0. Alternatively, the fourth value may be 0, and the fifth value may be 1.

Optionally, when a quantity of third bits is 1, the third bit corresponds to an SCG currently configured for the terminal. For example, the payload of the MAC CE is one byte, the 1st bit (that is, the third bit) in the payload corresponds to the SCG currently configured for the terminal, and the other seven bits are reserved bits. When a value of the $1^{st}$ bit is 1, the MAC CE indicates to deactivate the SCG configured for the terminal. When the value of the $1^{st}$ bit is 0, the MAC CE indicates to activate the SCG configured for the terminal.

Optionally, when the quantity of third bits is greater than 1, each third bit corresponds to one SCG. A specific implementation may be as follows: Each third bit corresponds to one cell group identifier (cell group identifier, cell group ID) whose value is not a sixth value. The cell group identifier is an RRC signaling configuration sent by the network device (for example, the master node or the secondary node). It should be noted that, in this implementation, a cell group identifier whose value is the sixth value indicates the MCG. For example, the sixth value may be 0.

For example, the fourth value is 1, and the fifth value is 0. It is assumed that the master node configures three SCGs for the terminal, and cell group identifiers of the three SCGs are 1, 2, and 3 respectively. The payload of the MAC CE includes three third bits. A third bit #1 corresponds to the cell group identifier 1, a third bit #2 corresponds to the cell group identifier 2, and a third bit #3 corresponds to the cell group identifier 3. Another bit in the payload may be a reserved bit. When a value of the third bit #1 is 1, a value of the third bit #2 is 0, and a value of the third bit #3 is 1, the MAC CE indicates the terminal to activate the SCG whose cell group identifier is 1 and the SCG whose cell group identifier is 3, and deactivate the SCG whose cell group identifier is 2.

In this embodiment of this application, the subheader of the MAC CE includes an LCID whose value is a first preset value. The first preset value may be preset based on a condition such as a stipulation of a communication protocol. Alternatively, the first preset value is determined by the network device and the terminal through negotiation.

Optionally, to distinguish the MAC CE provided in Implementation 2 from the MAC CE that is for activating/deactivating an SCell and that is in the conventional technology, the first preset value is not 57 or 58.

Implementation 3: When a subheader of the MAC CE includes an LCID whose value is a second preset value, the MAC CE indicates to deactivate the SCG. Alternatively, when a subheader of the MAC CE includes an LCID whose value is a third preset value, the MAC CE indicates to activate the SCG.

Based on Implementation 3, the MAC CE is applicable to all SCGs configured for the terminal.

The second preset value and the third preset value may be preset based on a condition such as a stipulation of a communication protocol. Alternatively, the second preset value and the third preset value are determined by the network device and the terminal through negotiation.

Optionally, to distinguish the MAC CE in Implementation 3 from the MAC CE that is for activating/deactivating an SCell and that is in the conventional technology, neither the second preset value nor the third preset value is 57 or 58.

Optionally, based on Implementation 3, the MAC CE may not include a payload, to reduce signaling overheads.

Based on the technical solution shown in FIG. 8, the first node sends, to the terminal, the MAC CE that carries the first indication information, so that the terminal can activate/deactivate, based on the MAC CE sent by the first node, the cell in the cell group managed by the second node, to resolve a problem that a MAC CE sent by one node cannot be used to activate/deactivate a cell in a cell group managed by another node in the conventional technology. Therefore, the technical solutions provided in this application can satisfy a requirement of a network side on using the MAC CE in some special scenarios. For example, in a scenario in which an SCG is deactivated, the technical solution provided in this application ensures that a master node can indicate, by using the MAC CE, a terminal to activate a cell in the SCG.

Figure 9:
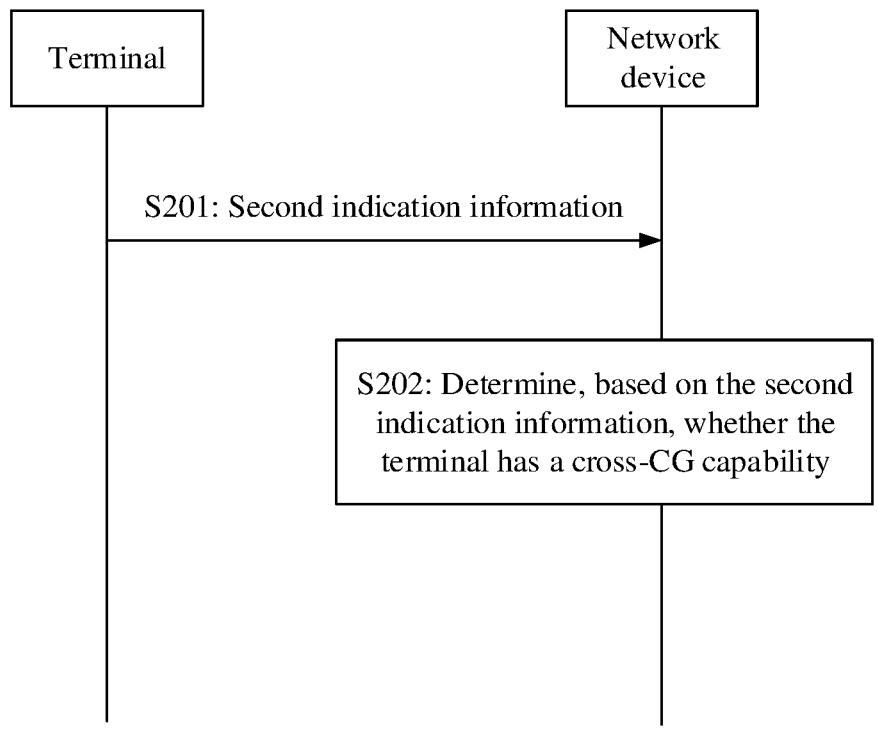
FIG. 9 is a flowchart of another configuration method according to an embodiment of this application.

FIG. 9 shows a configuration method provided in an embodiment of this application. The method includes the following steps.

S201: A terminal sends second indication information to a network device.

Correspondingly, the network device receives the second indication information sent by the terminal.

The network device may be a master node or a secondary node.

In this embodiment of this application, the second indication information indicates that the terminal has a cross-CG capability. Alternatively, the second indication information indicates that the terminal does not have the cross-CG capability.

Optionally, the cross-CG capability is a capability of the terminal to activate or deactivate, based on a MAC CE sent by a first node, a cell in a cell group managed by a second node. In other words, the terminal supports activating or deactivating, based on the MAC CE sent by the first node, the cell in the cell group managed by the second node.

In an implementation, the first node is a master node, the second node is a secondary node, and the cross-CG capability means that the terminal supports activating or deactivating an SCG based on the MAC CE delivered by the master node.

Optionally, the second indication information may use any one of the following designs.

Design 1: When the second indication information includes a first information element, the second indication information indicates that the terminal has the cross-CG capability. When the second indication information does not include the first information element, the second indication information indicates that the terminal does not have the cross-CG capability.

For example, based on Design 1, the first information element may be in the following format:

IE: crossCG ENUMERATED{true} OPTIONAL crossCG is a name of the first information element, and an enumerated value supported by the first information element is "true". OPTIONAL indicates that the first information element is optional.

Design 2: When the second indication information includes a first information element whose value is a first enumerated value, the second indication information indicates that the terminal has the cross-CG capability. When the second indication information includes a first information element whose value is a second enumerated value, the second indication information indicates that the terminal does not have the cross-CG capability.

For example, based on Design 2, the first information element may be in the following format:

IE: crossCG ENUMERATED{true, false} MANDATORY crossCG is a name of the first information element, and enumerated values supported by the first information element are "true" and "false". "true" is the first enumerated value, and "false" is the second enumerated value. MANDATORY indicates that the first information element is mandatory.

Optionally, the second indication information may reuse signaling in an existing procedure, to reduce signaling overheads. Certainly, the second indication information may alternatively not reuse the signaling in the existing procedure. This is not limited in this embodiment of this application.

In an implementation, the terminal may actively send the second indication information to the network device. For example, the terminal may actively send the second indication information to the network device after completing a random access process or completing a cell handover.

In another implementation, the terminal may passively send the second indication information to the network device. For example, the terminal receives first request information sent by the network device, where the first request information indicates the terminal to report the second indication information. Then, the terminal sends the second indication information to the network device.

Optionally, when the network device is a master node, after the master node receives the second indication information sent by the terminal, the master node may send the second indication information of the terminal to a secondary node, so that the secondary node determines whether the terminal has the cross-CG capability.

Optionally, when the network device is a secondary node, after the secondary node receives the second indication information sent by the terminal, the secondary node may send the second indication information of the terminal to a master node, so that the master node determines whether the terminal has the cross-CG capability.

S202: The network device determines, based on the second indication information, whether the terminal has the cross-CG capability.

In this way, when the second indication information indicates that the terminal does not have the cross-CG capability, the network device does not use the MAC CE provided in the embodiment shown in FIG. 8. When the second indication information indicates that the terminal has the cross-CG capability, the network device may perform steps S101 and S102 in FIG. 8, and the terminal may perform step S103 in FIG. 8.

Figure 10:
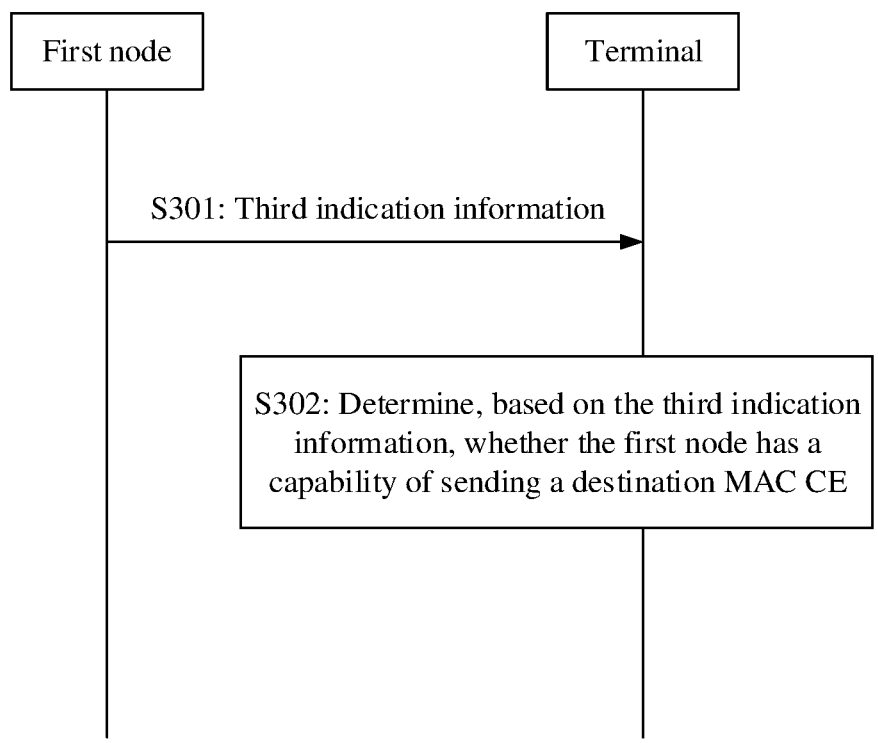
FIG. 10 is a flowchart of another configuration method according to an embodiment of this application.

FIG. 10 shows a configuration method provided in an embodiment of this application. The method includes the following steps.

S301: A first node sends third indication information to a terminal. Correspondingly, the terminal receives the third indication information sent by the first node.

The first node is a master node or a secondary node.

The third indication information indicates that the first node has a capability of sending a target MAC CE. Alternatively, the third indication information indicates that the first node does not have the capability of sending the target MAC CE. The target MAC CE may be the MAC CE in Implementation 1, Implementation 2, or Implementation 3 in the embodiment shown in FIG. 8.

Optionally, the third indication information may use any one of the following designs.

Design 1: When the third indication information includes a second information element, the third indication information indicates that the first node has the capability of sending the target MAC CE. When the third indication information does not include the second information element, the third indication information indicates that the first node does not have the capability of sending the target MAC CE.

Design 2: When the third indication information includes a second information element whose value is a third enumerated value, the third indication information indicates that the first node has the capability of sending the target MAC CE. When the third indication information includes a second information element whose value is a fourth enumerated value, the third indication information indicates that the first node does not have the capability of sending the target MAC CE.

For example, the third enumerated value may be "true", and the fourth enumerated value may be "false".

Optionally, the third indication information may reuse signaling in an existing procedure, for example, signaling in an initial access procedure, to reduce signaling overheads. Certainly, the third indication information may alternatively not reuse the signaling in the existing procedure. This is not limited in this embodiment of this application.

In a possible implementation, the first node sends the third indication information to the terminal in a broadcast manner.

In another possible implementation, the first node sends RRC signaling to the terminal, where the RRC signaling includes the third indication information.

S302: The terminal determines, based on the third indication information, whether the first node has the capability of sending the target MAC CE.

In this way, when the third indication information indicates that the first node does not have the capability of sending the target MAC CE, the first node does not use the MAC CE (namely, the target MAC CE) provided in the embodiment shown in FIG. 8.

When the third indication information is used, the first node may perform steps S101 and S102 in FIG. 8, and the terminal may perform step S103 in FIG. 8. In other words, the terminal may parse the target MAC CE according to the method described in the embodiment shown in FIG. 8.

When the first node does not have a capability of sending a MAC CE that carries the first indication information, the terminal parses, according to a method in a conventional technology, a MAC CE that is for activating/deactivating an SCell.

In the conventional technology, when an SCG of the terminal is in a deactivated state, when the terminal receives instructions for activating the SCG, the terminal initiates contention-based random access to a secondary node, so that uplink synchronization is implemented between the terminal and the secondary node, and the terminal obtains a corresponding uplink resource.

However, in a contention-based random access process, because a preamble used by the terminal may be the same as a preamble used by another terminal, the random access process of the terminal fails due to a conflict, and consequently, the terminal fails to activate the SCG.

To resolve this technical problem, this application provides a configuration method. For a specific implementation of the configuration method, refer to FIG. 11 or FIG. 12.

Figure 11:
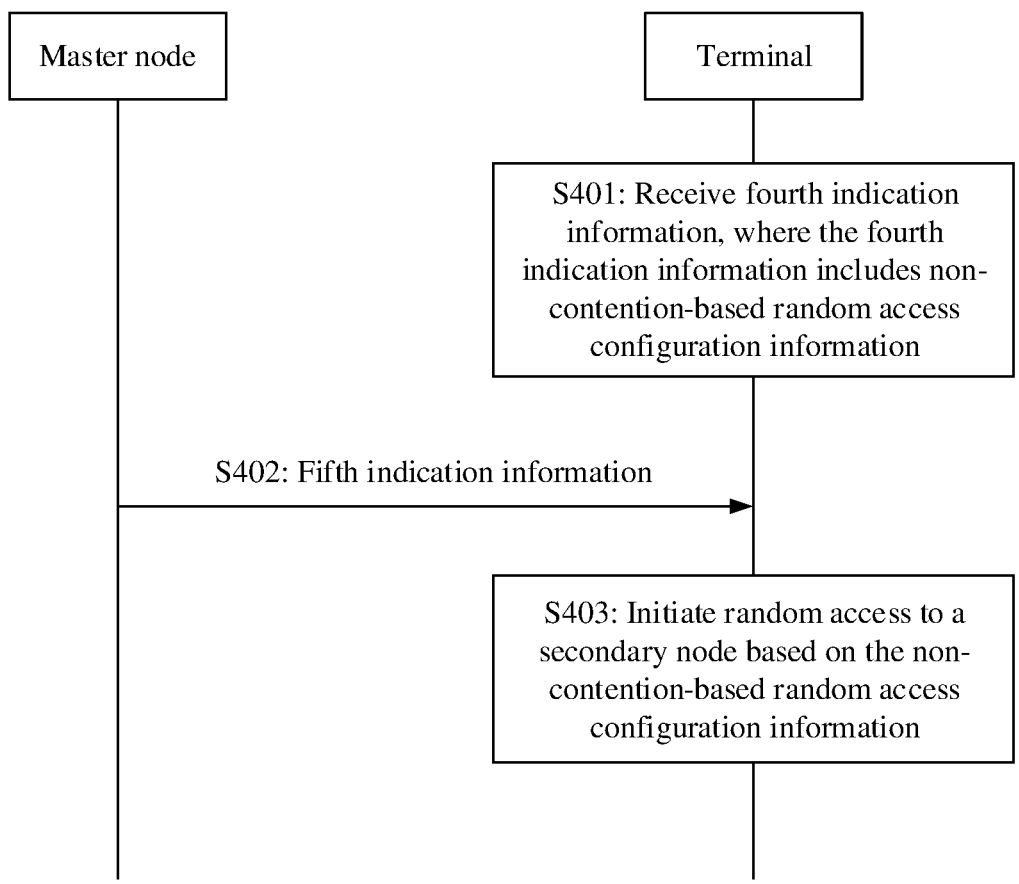
FIG. 11 is a flowchart of another configuration method according to an embodiment of this application.

As shown in FIG. 11, the configuration method includes the following steps.

S401: A terminal receives fourth indication information.

The fourth indication information indicates to deactivate an SCG. The fourth indication information includes non-contention-based random access configuration information.

Optionally, the non-contention-based random access configuration information includes a dedicated preamble (preamble), a dedicated random access configuration parameter (RACH-ConfigDedicated), and the like.

In this embodiment of this application, the non-contention-based random access configuration information includes two-step non-contention-based random access configuration information and/or four-step non-contention-based random access configuration information.

Optionally, the fourth indication information may be carried in RRC signaling, downlink control information (downlink control information) DCI, or a MAC CE.

In a possible implementation, the terminal receives the fourth indication information sent by a master node.

It should be noted that the master node may obtain the non-contention-based random access configuration information from a secondary node. For example, a message that is sent by a secondary station to a master station and that indicates that data is inactive may carry a non-contention-based random access configuration, or an SN modification request (SN Modification Required) message sent by the secondary station to the master station may carry the non-contention-based random access configuration.

Optionally, the foregoing message that indicates that the data is inactive may be an activity notification (Activity Notification) message, and the activity notification message carries an information element that indicates a data activity, where a value of the information element is "inactive (inactive)".

In another possible implementation, the terminal receives the fourth indication information sent by a secondary node.

S402: The master node sends fifth indication information to the terminal. Correspondingly, the terminal receives the fifth indication information sent by the master node.

The fifth indication information indicates to activate at least a PSCell in the SCG. Optionally, the fifth indication information further indicates to activate one or more SCells in the SCG.

Optionally, the fifth indication information may be carried in RRC signaling, DCI, or a MAC CE.

S403: The terminal initiates random access to the secondary node based on the non-contention-based random access configuration information.

It may be understood that if the fourth indication information includes only the two-step non-contention-based random access configuration information, the terminal initiates two-step non-contention-based random access to the secondary node. If the fourth indication information includes only the four-step non-contention-based random access configuration information, the terminal initiates four-step non-contention-based random access to the secondary node. If the fourth indication information includes both the two-step non-contention-based random access configuration information and the four-step non-contention-based random access configuration information, the terminal may initiate two-step non-contention-based random access or four-step non-contention-based random access based on an actual situation of the terminal.

Based on the technical solution shown in FIG. 11, on one hand, because the fourth indication information indicating to deactivate the SCG includes the non-contention-based random access configuration information, after receiving the fifth indication information, the terminal may directly initiate random access based on the non-contention-based random access configuration information included in the fourth indication information, without waiting for a network side to deliver the non-contention-based random access configuration information, so that a delay of initiating random access by the terminal is reduced. On the other hand, in comparison with a conventional technology in which the terminal initiates contention-based random access to activate a cell in the SCG, in the technical solution provided in this application, the terminal initiates non-contention-based random access to activate the cell in the SCG, so as to avoid a problem that a random access failure is caused by a conflict and contention, so that random access is completed more quickly, and the cell in the SCG is further activated more quickly.

Figure 12:
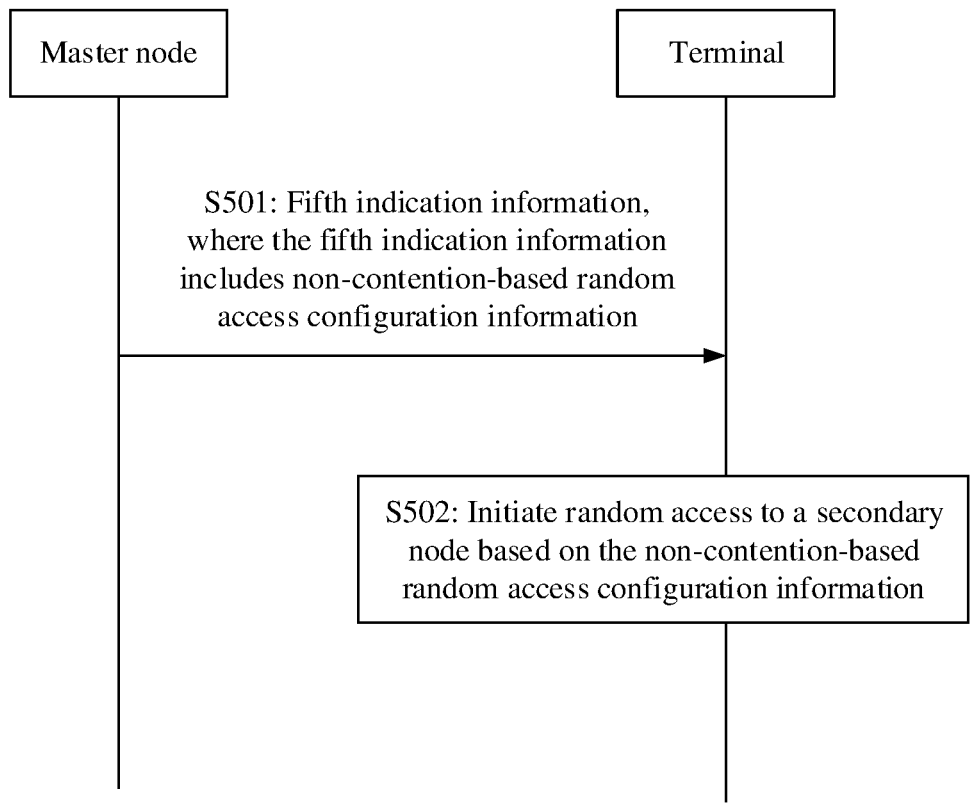
FIG. 12 is a flowchart of another configuration method according to an embodiment of this application.

FIG. 12 shows a configuration method provided in an embodiment of this application. The method includes the following steps.

S501: A master node sends fifth indication information to a terminal. Correspondingly, the terminal receives the fifth indication information sent by the master node.

The fifth indication information indicates to activate at least a PSCell in an SCG. Optionally, the fifth indication information further indicates to activate one or more SCells in the SCG.

Optionally, the fifth indication information may be carried in RRC signaling, DCI, or a MAC CE.

In this embodiment of this application, the fifth indication information includes non-contention-based random access configuration information. The non-contention-based random access configuration information includes two-step non-contention-based random access configuration information and/or four-step non-contention-based random access configuration information.

It should be noted that the master node may obtain the non-contention-based random access configuration information from a secondary node.

S502: The terminal initiates random access to the secondary node based on the non-contention-based random access configuration information.

It may be understood that if the fifth indication information includes only the two-step non-contention-based random access configuration information, the terminal initiates two-step non-contention-based random access to the secondary node. If the fifth indication information includes only the four-step non-contention-based random access configuration information, the terminal initiates four-step non-contention-based random access to the secondary node. If the fifth indication information includes both the two-step non-contention-based random access configuration information and the four-step non-contention-based random access configuration information, the terminal may initiate two-step non-contention-based random access or four-step non-contention-based random access based on an actual situation of the terminal.

Based on the technical solution shown in FIG. 12, on one hand, because the fifth indication information includes the non-contention-based random access configuration information, after receiving the fifth indication information, the terminal may directly initiate random access based on the non-contention-based random access configuration information included in the fifth indication information, without waiting for a network side to deliver the non-contention-based random access configuration information, so that a delay of initiating random access by the terminal is reduced. On the other hand, in comparison with a conventional technology in which the terminal initiates contention-based random access to activate a cell in the SCG, in the technical solution provided in this application, the terminal initiates non-contention-based random access to activate the cell in the SCG, so as to avoid a problem that a random access failure is caused by a conflict and contention, so that random access is completed more quickly, and the cell in the SCG is further activated more quickly.

Figure 13:
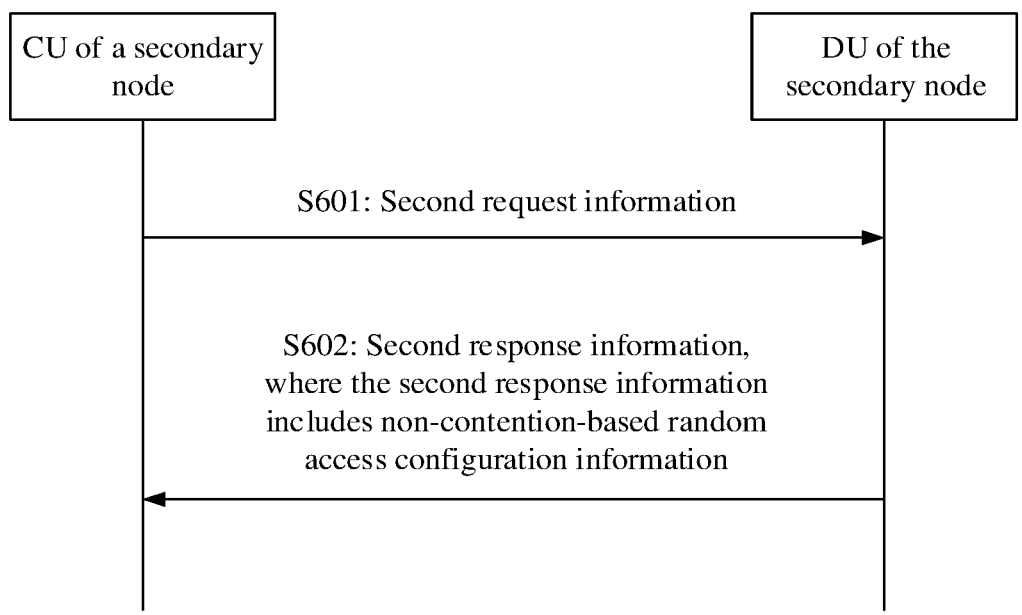
FIG. 13 is a flowchart of another configuration method according to an embodiment of this application.

As shown in FIG. 13, when a secondary node uses a CU-DU architecture, that a CU of the secondary node obtains non-contention-based random access configuration information includes the following steps.

S601: The CU of the secondary node sends second request information to a DU of the secondary node. Correspondingly, the DU of the secondary node receives the second request information sent by the CU of the secondary node.

The second request information is for requesting the non-contention-based random access configuration information.

Optionally, the second request information may be carried in existing signaling, for example, a terminal context modification request (UE context modification request) message.

In a possible implementation, when a preset condition is satisfied, the CU of the secondary node sends the second request information to the DU of the secondary node.

For example, the preset condition may be any one of the following:

Condition 1: The CU of the secondary node receives indication information that is sent by a master node and that is for activating an SCG.

Condition 2: The CU of the secondary node determines to activate an SCG.

Condition 3: The CU of the secondary node receives indication information that is sent by a master node and that is for deactivating an SCG.

Condition 4: The CU of the secondary node determines to deactivate an SCG.

Optionally, based on Condition 1 or Condition 2, the second request information may include the indication information for activating the SCG.

Optionally, based on Condition 3 or Condition 4, the second request information may include the indication information for deactivating the SCG.

S602: The DU of the secondary node sends second response information to the CU of the secondary node. Correspondingly, the CU of the secondary node receives the second response information sent by the DU of the secondary node.

The second response information is for responding to the second request information. The second response information includes the non-contention-based random access configuration information. The non-contention-based random access configuration information includes two-step non-contention-based random access configuration information and/or four-step non-contention-based random access configuration information.

Optionally, the second response information may be carried in existing signaling, for example, a terminal context modification response (UE context modification response) message.

Based on the technical solution shown in FIG. 13, when the secondary node uses the CU-DU architecture, the CU of the secondary node may obtain the non-contention-based random access configuration information from the DU of the secondary node.

Optionally, after the CU of the secondary node obtains the non-contention-based random access configuration information, the CU of the secondary node may send the non-contention-based random access configuration information to the master node. In this way, the master node may perform step S401 in FIG. 11 or step S501 in FIG. 12.

Alternatively, after the CU of the secondary node obtains the non-contention-based random access configuration information, the CU of the secondary node may perform step S401 in FIG. 11.

It may be understood that, in embodiments of this application, the terminal and/or the network device (the master node or the secondary node) may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all operations in embodiments of this application need to be performed.

It may be understood that, to implement the foregoing functions, the terminal includes a corresponding hardware structure and/or software module for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the terminal may be divided into function modules based on the foregoing method examples. For example, each function module may be obtained through division based on a corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used. An example in which each function module is obtained through division based on each corresponding function is used below for description.

Figure 14:
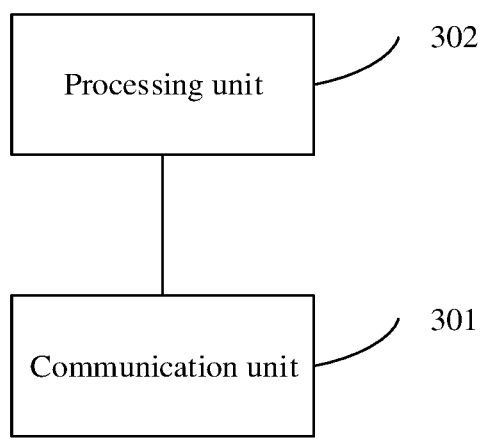
FIG. 14 is a schematic diagram of a structure of a communication apparatus according to an embodiment of this application.

FIG. 14 is a schematic diagram of a structure of a communication apparatus according to an embodiment of this application. The communication apparatus includes a communication unit 301 and a processing unit 302.

When the communications apparatus shown in FIG. 14 is a terminal, the communication unit 301 is configured to support the terminal in performing, for example, step S102 in FIG. 8, step S201 in FIG. 9, step S301 in FIG. 10, steps S401 and S402 in FIG. 11, or step S501 in FIG. 12. The processing unit 302 is configured to support the terminal in performing, for example, step S103 in FIG. 8, step S302 in FIG. 10, step S403 in FIG. 11, or step S502 in FIG. 12. All related content of each step involved in the foregoing method embodiment may be referenced to a function description of a corresponding functional unit, and details are not described herein again.

When the communication apparatus shown in FIG. 14 is a network device, the communication unit 301 is configured to support the network device in performing, for example, step S102 in FIG. 8, step S201 in FIG. 9, step S301 in FIG. 10, steps S401 and S402 in FIG. 11, or step S501 in FIG. 12. The processing unit 302 is configured to support the network device in performing, for example, step S101 in FIG. 8 or step S202 in FIG. 9. All related content of each step involved in the foregoing method embodiment may be referenced to a function description of a corresponding functional unit, and details are not described herein again.

In an example, when the communication apparatus shown in FIG. 14 is a terminal, the communication unit 301 in FIG. 14 may be implemented by the transceiver 103 in FIG. 5, and the processing unit 302 in FIG. 14 may be implemented by the processor 101 in FIG. 5. This is not limited in this embodiment of this application.

For example, when the communication apparatus shown in FIG. 14 is a network device, the communication unit 301 in FIG. 14 may be implemented by the transceiver 203 in FIG. 5, and the processing unit 302 in FIG. 14 may be implemented by the processor 201 in FIG. 5. This is not limited in this embodiment of this application.

An embodiment of this application further provides a computer-readable storage medium. The computer-readable storage medium stores computer instructions. When the computer-readable storage medium runs on the terminal or the network device shown in FIG. 5, the terminal or the network device is enabled to perform the configuration methods shown in FIG. 8 to FIG. 13.

The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive (solid-state drive, SSD)), or the like.

An embodiment of this application further provides a chip. The chip includes a processing module and a communication interface. The communication interface is configured to receive an input signal and provide the input signal to the processing module, and/or is configured to process and output a signal generated by the processing module. The processing is configured to support a communication apparatus in performing the configuration methods shown in FIG. 8 to FIG. 13. In an implementation, the processing module may run code instructions to perform the configuration methods shown in FIG. 8 to FIG. 13. The code instructions may be from a memory inside the chip, or may be from a memory outside the chip. The processing module is a processor, a microprocessor, or an integrated circuit integrated on the chip. The communication interface may be an input/output circuit or a transceiver pin.

An embodiment of this application further provides a computer program product including computer instructions. When the computer program product runs on a communication apparatus, the communication apparatus is enabled to perform the configuration methods shown in FIG. 8 to FIG. 13.

An embodiment of this application further provides a communication system, including a network device and a terminal. The network device may perform related steps in FIG. 8 to FIG. 13. The terminal may perform related steps in FIG. 8 to FIG. 12.

The terminal, the network device, the computer storage medium, the chip, and the computer program product provided in the foregoing embodiments of this application are all configured to perform the configuration method provided above. Therefore, for beneficial effects that can be achieved by the terminal, the network device, the computer storage medium, the chip, and the computer program product, refer to the beneficial effects corresponding to the methods provided above. Details are not described herein again.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A configuration method, wherein the method is performed by a terminal, and the method comprises:
   receiving a media access control control element (MAC CE) from a first node, wherein the MAC CE indicates to activate or deactivate one or more cells in a cell group managed by a second node, and the first node is different from the second node; and
   activating or deactivating, based on the MAC CE, the one or more cells in the cell group managed by the second node, wherein the first node is a master node, the second node is a secondary node, and the cell group managed by the second node is a secondary cell group (SCG),
   wherein, in response to a primary secondary cell in the SCG being in an activated state, the MAC CE indicates to deactivate and the method comprises, based on the MAC CE, deactivating:
   all cells in the SCG, or
   one or more secondary cells in the SCG.

2. The configuration method according to claim 1, wherein
   in response to all cells in the SCG being in a deactivated state, the MAC CE indicates to activate and the method comprises, based on the MAC CE, activating:
   at least the primary secondary cell, or
   at least the primary secondary cell and at least one secondary cell.

3. The configuration method according to claim 2, wherein
   in response to the primary secondary cell in the SCG being in the activated state, the MAC CE indicates to deactivate and the method comprises, based on the MAC CE, deactivating:
   all cells in the SCG.

4. The configuration method according to claim 1, wherein the MAC CE comprises first indication information, and the first indication information is a reserved bit whose value is a first value in a payload of the MAC CE.

5. The configuration method according to claim 4, wherein
   a master cell group (MCG) comprises a primary cell and M secondary cells,
   the SCG comprises the primary secondary cell and N−1 secondary cells,
   the payload of the MAC CE comprises M first bits and N second bits, wherein M is a nonnegative integer, and N is a positive integer,
   the M first bits are in a one-to-one correspondence with the M secondary cells in the MCG, wherein a value of a first bit among the M first bits is:
   a second value which indicates to activate the secondary cell corresponding to the first bit, or a third value which indicates to deactivate the secondary cell corresponding to the first bit, and
   the N second bits are in a one-to-one correspondence with the N cells in the SCG, wherein a value of a second bit among the N second bits is:

a second value which indicates to activate the cell corresponding to the second bit, or a third value which indicates to deactivate the cell corresponding to the second bit.

6. The configuration method according to claim 1, wherein
a subheader of the MAC CE comprises a logical channel identifier (LCID) whose value is:
a second preset value which indicates to deactivate the SCG, or
a third preset value which indicates to activate the SCG.

7. The configuration method according to claim 1, wherein the method further comprises:
sending second indication information to the first node or the second node, wherein
the second indication information indicates that the terminal has a capability of activating or deactivating, based on the MAC CE from the first node, the one or more cells in the cell group managed by the second node, or
the second indication information indicates that the terminal does not have the capability of activating or deactivating, based on the MAC CE from the first node, the one or more cells in the cell group managed by the second node.

8. A communication apparatus, comprising:
at least one processor,
at least one memory in communication with the at least one processor and configured to store program instructions that, when executed by the at least one processor, cause the communication apparatus to perform operations comprising:
receiving a media access control control element (MAC CE) from a first node, wherein the MAC CE indicates to activate or deactivate one or more cells in a cell group managed by a second node, and the first node is different from the second node; and
activating or deactivating, based on the MAC CE, the one or more cells in the cell group managed by the second node, wherein the first node is a master node, the second node is a secondary node, and the cell group managed by the second node is a secondary cell group (SCG),
wherein, in response to a primary secondary cell in the SCG being in an activated state, the MAC CE indicates to deactivate and the operations comprise, based on the MAC CE, deactivating:
all cells in the SCG, or
one or more secondary cells in the SCG.

9. The communication apparatus according to claim 8, wherein
in response to all cells in the SCG being in a deactivated state, the MAC CE indicates to activate and the operations comprise, based on the MAC CE, activating:
at least the primary secondary cell, or
at least the primary secondary cell and at least one secondary cell.

10. The communication apparatus according to claim 8, wherein
in response to the primary secondary cell in the SCG being in the activated state, the MAC CE indicates to deactivate and the operations comprise, based on the MAC CE, deactivating:
all cells in the SCG.

11. The communication apparatus according to claim 8, wherein the MAC CE comprises first indication information, and the first indication information is a reserved bit whose value is a first value in a payload of the MAC CE.

12. The communication apparatus according to claim 11, wherein
a master cell group (MCG) comprises a primary cell and M secondary cells,
the SCG comprises the primary secondary cell and N−1 secondary cells,
the payload of the MAC CE comprises M first bits and N second bits, wherein M is a nonnegative integer, and N is a positive integer,
the M first bits are in a one-to-one correspondence with the M secondary cells in the MCG, wherein a value of a first bit among the M first bits is:
a second value which indicates to activate the secondary cell corresponding to the first bit, or a third value which indicates to deactivate the secondary cell corresponding to the first bit, and
the N second bits are in a one-to-one correspondence with the N cells in the SCG, wherein a value of a second bit among the N second bits is:
a second value which indicates to activate the cell corresponding to the second bit, or a third value which indicates to deactivate the cell corresponding to the second bit.

13. The communication apparatus according to claim 8, wherein
a subheader of the MAC CE comprises a logical channel identifier (LCID) whose value is:
a second preset value which indicates to deactivate the SCG, or
a third preset value which indicates to activate the SCG.

14. The communication apparatus according to claim 8, wherein the operations further comprise:
sending second indication information to the first node or the second node, wherein
the second indication information indicates that the communication apparatus has a capability of activating or deactivating, based on the MAC CE from the first node, the one or more cells in the cell group managed by the second node, or
the second indication information indicates that the communication apparatus does not have the capability of activating or deactivating, based on the MAC CE from the first node, the one or more cells in the cell group managed by the second node.

15. A communication apparatus, comprising:
at least one processor,
at least one memory in communication with the at least one processor and configured to store program instructions that, when executed by the at least one processor, cause the communication apparatus to perform operations comprising:
generating a media access control control element (MAC CE), wherein the MAC CE indicates to activate or deactivate one or more cells in a cell group managed by a second node, and the communication apparatus is different from the second node; and
sending the MAC CE to a terminal, wherein the communication apparatus is a master node, the second node is a secondary node, and the cell group managed by the second node is a secondary cell group (SCG),
wherein, in response to a primary secondary cell in the SCG being in an activated state, the MAC CE indicates to deactivate:
all cells in the SCG, or
one or more secondary cells in the SCG.

16. The communication apparatus according to claim 15, wherein
in response to all cells in the SCG being in a deactivated state, the MAC CE indicates to activate:
at least the primary secondary cell, or
at least the primary secondary cell and at least one secondary cell.

17. The communication apparatus according to claim 15, wherein
in response to the primary secondary cell in the SCG being in the activated state, the MAC CE indicates to deactivate:
all cells in the SCG.

18. The communication apparatus according to claim 15, wherein the MAC CE comprises first indication information, and the first indication information is a reserved bit whose value is a first value in a payload of the MAC CE.

19. The communication apparatus according to claim 18, wherein
a master cell group (MCG) comprises a primary cell and M secondary cells,
the SCG comprises the primary secondary cell and N−1 secondary cells,
the payload of the MAC CE comprises M first bits and N second bits, wherein M is a nonnegative integer, and N is a positive integer,
the M first bits are in a one-to-one correspondence with the M secondary cells in the MCG, wherein a value of a first bit among the M first bits is:
a second value which indicates to activate the secondary cell corresponding to the first bit, or a third value which indicates to deactivate the secondary cell corresponding to the first bit, and
the N second bits are in a one-to-one correspondence with the N cells in the SCG, wherein a value of a second bit among the N second bits is:
a second value which indicates to activate the cell corresponding to the second bit, or a third value which indicates to deactivate the cell corresponding to the second bit.

20. The communication apparatus according to claim 15, wherein the operations further comprise:
receiving second indication information from the terminal, wherein
the second indication information indicates that the terminal has a capability of activating or deactivating, based on the MAC CE from the communication apparatus, the one or more cells in the cell group managed by the second node, or
the second indication information indicates that the terminal does not have the capability of activating or deactivating, based on the MAC CE from the communication apparatus, the one or more cells in the cell group managed by the second node.

* * * * *